(12) United States Patent
Chan et al.

(10) Patent No.: US 9,778,419 B1
(45) Date of Patent: Oct. 3, 2017

(54) FIBER OPTICAL SYSTEM WITH FIBER END FACE AREA RELATIONSHIPS

(71) Applicant: The Boeing Company, Chicago, IL (US)

(72) Inventors: Eric Y. Chan, Mercer Island, WA (US); Dennis G. Koshinz, Bellevue, WA (US); Tuong K. Truong, Redmond, WA (US); Henry B. Pang, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/191,427

(22) Filed: Jun. 23, 2016

(51) Int. Cl.
*G02B 6/28* (2006.01)
*G02B 6/255* (2006.01)
*G02B 6/02* (2006.01)

(52) U.S. Cl.
CPC ....... *G02B 6/2808* (2013.01); *G02B 6/02038* (2013.01); *G02B 6/255* (2013.01)

(58) Field of Classification Search
CPC .... G02B 6/02038; G02B 6/2038; G02B 6/02; G02B 6/255; G02B 6/28; G02B 6/2808
See application file for complete search history.

(56) References Cited

U.S. PATENT DOCUMENTS

| | | | | |
|---|---|---|---|---|
| 3,756,688 A | * | 9/1973 | Hudson | G02B 6/4203 385/124 |
| 3,870,398 A | * | 3/1975 | Love | G02B 6/2817 359/833 |
| 3,874,781 A | * | 4/1975 | Thiel | G02B 6/2808 385/24 |
| 3,883,217 A | * | 5/1975 | Love | G02B 6/2808 385/24 |
| 3,883,222 A | * | 5/1975 | Gunderson | G02B 6/2808 385/24 |
| 3,901,581 A | * | 8/1975 | Thiel | G02B 6/2808 385/24 |
| 3,901,582 A | * | 8/1975 | Milton | G02B 6/2817 359/900 |
| 3,933,410 A | * | 1/1976 | Milton | G02B 6/04 385/31 |
| 3,936,141 A | * | 2/1976 | Milton | G02B 6/2808 385/115 |
| 4,054,366 A | * | 10/1977 | Barnoski | G02B 6/2835 385/24 |
| 4,072,399 A | * | 2/1978 | Love | G02B 6/2808 385/24 |

(Continued)

*Primary Examiner* — Andrew Jordan
(74) *Attorney, Agent, or Firm* — Ostrager Chong Flaherty & Broitman P.C.

(57) ABSTRACT

An optical network having at least one star coupler comprising transmit and receive optical mixers which are respectively optically coupled to transmitters and receivers of a plurality of optical-electrical media converters. Each optical-electrical media converter comprises a respective receiver optically coupled to the receive optical mixer by way of plastic optical fibers and a respective transmitter optically coupled to the transmit optical mixer by way of plastic optical fibers. The output plastic optical fibers attached to an output face of the receive optical mixer have a diameter less than the diameter of the input plastic optical fibers attached to an input face of the receive optical mixer.

10 Claims, 16 Drawing Sheets

(56) References Cited

U.S. PATENT DOCUMENTS

| | | | | |
|---|---|---|---|---|
| 4,089,583 A * | 5/1978 | Auracher | G02B 6/2804 | 385/31 |
| 4,092,059 A * | 5/1978 | Hawkes | G02B 6/2808 | 385/46 |
| 4,142,877 A * | 3/1979 | Auracher | G02B 6/2804 | 156/219 |
| 4,198,118 A * | 4/1980 | Porter | G02B 6/2808 | 385/140 |
| 4,387,441 A * | 6/1983 | Kocol | G06F 15/17337 | 370/412 |
| 4,417,334 A * | 11/1983 | Gunderson | H04B 10/2725 | 340/2.9 |
| 4,493,211 A * | 1/1985 | Weinstein | G01M 9/04 | 73/147 |
| 4,494,185 A * | 1/1985 | Gunderson | H04B 10/2725 | 398/54 |
| 4,496,211 A * | 1/1985 | Daniel | G02B 6/262 | 385/147 |
| 4,511,208 A * | 4/1985 | Ozeki | G02B 6/2817 | 385/24 |
| 4,531,239 A * | 7/1985 | Usui | H04L 12/44 | 370/446 |
| 4,583,161 A * | 4/1986 | Gunderson | H04B 10/2725 | 714/52 |
| 4,707,062 A * | 11/1987 | Abe | G02B 6/2808 | 385/24 |
| 4,708,424 A * | 11/1987 | Marhic | G02B 6/2804 | 359/900 |
| 4,740,050 A * | 4/1988 | Husain | G02B 6/12004 | 385/140 |
| 4,783,850 A * | 11/1988 | MacDonald | H04Q 11/0005 | 398/204 |
| 4,824,200 A * | 4/1989 | Isono | G02B 6/29367 | 385/24 |
| 4,826,275 A * | 5/1989 | Heinzman | H04B 10/2725 | 385/46 |
| 4,913,508 A * | 4/1990 | Blyler, Jr. | G02B 6/2808 | 385/50 |
| 4,915,469 A * | 4/1990 | Byron | G02B 6/2813 | 385/46 |
| 4,948,218 A * | 8/1990 | Kobayashi | H04B 10/508 | 385/24 |
| 4,984,864 A * | 1/1991 | Blyler, Jr. | G02B 6/2808 | 385/46 |
| 5,035,480 A * | 7/1991 | Dutt | G02B 6/2856 | 385/24 |
| 5,268,980 A * | 12/1993 | Yuuki | H04B 10/27 | 385/42 |
| 5,271,079 A * | 12/1993 | Levinson | G02B 6/2808 | 385/43 |
| 5,282,257 A * | 1/1994 | Ota | G02B 6/125 | 359/333 |
| 5,317,662 A * | 5/1994 | Hotea | G02B 6/2808 | 385/46 |
| 5,408,551 A * | 4/1995 | Maria van Woesik | G02B 6/2808 | 385/28 |
| 5,510,920 A * | 4/1996 | Ota | G02B 6/4246 | 398/54 |
| 5,523,879 A * | 6/1996 | Ota | G02B 6/125 | 359/333 |
| 5,570,226 A * | 10/1996 | Ota | G02B 6/125 | 359/333 |
| 5,684,899 A * | 11/1997 | Ota | G02B 6/12007 | 385/14 |
| 5,773,345 A * | 6/1998 | Ota | G02B 6/125 | 117/918 |
| 5,854,700 A * | 12/1998 | Ota | G02B 6/12007 | 398/60 |
| 5,915,054 A * | 6/1999 | Ota | G02B 6/12007 | 385/46 |
| 5,959,752 A * | 9/1999 | Ota | H04B 10/1143 | 398/103 |
| 5,970,191 A * | 10/1999 | Oba | G02B 6/125 | 385/24 |
| 5,991,478 A * | 11/1999 | Lewis | H04B 10/801 | 385/25 |
| 6,062,742 A * | 5/2000 | Yuuki | G02B 6/4204 | 385/43 |
| 6,104,849 A * | 8/2000 | Lewis | H04B 10/801 | 385/25 |
| 6,116,789 A * | 9/2000 | Mrakovich | G02B 6/3825 | 385/139 |
| 6,181,853 B1 * | 1/2001 | Wade | G02B 6/29307 | 385/14 |
| 6,195,477 B1 * | 2/2001 | Denuto | G02B 6/3878 | 362/551 |
| 6,212,315 B1 * | 4/2001 | Doerr | G02B 6/12016 | 385/15 |
| 6,219,480 B1 * | 4/2001 | Cassarly | G02B 6/2804 | 385/31 |
| 6,697,874 B1 * | 2/2004 | Friden | H04L 12/40032 | 370/462 |
| 6,756,781 B2 * | 6/2004 | Duncan | G01R 15/245 | 324/244.1 |
| 6,921,920 B2 * | 7/2005 | Kazakevich | A61B 1/0607 | 257/81 |
| 6,960,029 B2 * | 11/2005 | Iijima | G02B 6/25 | 385/85 |
| 7,345,312 B2 * | 3/2008 | Kazakevich | A61B 1/0607 | 257/79 |
| 7,540,645 B2 * | 6/2009 | Kazakevich | A61B 1/0607 | 257/13 |
| 7,798,692 B2 * | 9/2010 | Krupa | A61B 1/07 | 362/555 |
| 7,959,338 B2 * | 6/2011 | Kazakevich | A61B 1/0607 | 362/554 |
| 7,965,913 B2 | 6/2011 | Chan et al. | | |
| 8,233,754 B2 * | 7/2012 | Bohnert | G01R 15/242 | 385/12 |
| 8,346,101 B2 * | 1/2013 | De Langen | H04B 10/0779 | 398/16 |
| 8,478,127 B2 * | 7/2013 | Chan | H04B 10/504 | 398/135 |
| 8,479,122 B2 * | 7/2013 | Hotelling | G06F 3/0418 | 715/767 |
| 8,521,032 B2 * | 8/2013 | Truong | H04B 10/40 | 398/136 |
| 8,545,077 B2 * | 10/2013 | Kazakevich | A61B 1/0607 | 362/554 |
| 8,554,032 B2 | 10/2013 | Koshinz et al. | | |
| 8,801,253 B2 * | 8/2014 | Krupa | A61B 1/07 | 362/555 |
| 8,833,991 B2 * | 9/2014 | Kishimoto | F21S 48/1154 | 362/237 |
| 8,899,845 B2 * | 12/2014 | Gallegos | G02B 6/3826 | 385/76 |
| 9,115,395 B2 * | 8/2015 | Wietzorrek | C12Q 1/686 | |
| 9,116,282 B2 * | 8/2015 | Kazakevich | A61B 1/0607 | |
| 9,297,970 B1 | 3/2016 | Chan et al. | | |
| 2003/0042493 A1 * | 3/2003 | Kazakevich | A61B 1/0607 | 257/98 |
| 2003/0049012 A1 * | 3/2003 | Iijima | G02B 6/25 | 385/147 |
| 2003/0146748 A1 * | 8/2003 | Duncan | G01R 15/245 | 324/244.1 |
| 2005/0053335 A1 * | 3/2005 | Wipiejewski | H01L 31/1085 | 385/88 |
| 2005/0276553 A1 * | 12/2005 | Kazakevich | A61B 1/0607 | 385/115 |
| 2007/0019912 A1 * | 1/2007 | Lutz | G02B 27/0994 | 385/43 |
| 2007/0269166 A1 * | 11/2007 | Brode | G02B 6/3806 | 385/55 |
| 2008/0112182 A1 * | 5/2008 | Kazakevich | A61B 1/0607 | 362/551 |

(56) References Cited

U.S. PATENT DOCUMENTS

| | | | |
|---|---|---|---|
| 2008/0130311 A1* | 6/2008 | Kazakevich | A61B 1/0607 362/553 |
| 2009/0257716 A1* | 10/2009 | Chan | G02B 6/2817 385/46 |
| 2010/0278478 A1* | 11/2010 | Kuo | G02B 6/2808 385/24 |
| 2011/0205751 A1* | 8/2011 | Kazakevich | A61B 1/0607 362/554 |
| 2011/0243566 A1* | 10/2011 | Truong | H04B 10/40 398/116 |
| 2012/0219286 A1* | 8/2012 | De Langen | H04B 10/0779 398/27 |
| 2013/0148926 A1* | 6/2013 | Koshinz | G02B 6/2808 385/46 |
| 2014/0029290 A1* | 1/2014 | Kazakevich | A61B 1/0607 362/554 |
| 2014/0205245 A1* | 7/2014 | Gallegos | G02B 6/3826 385/81 |
| 2014/0218779 A1* | 8/2014 | Mukawa | G02B 5/1814 359/15 |
| 2015/0036974 A1* | 2/2015 | Chan | G02B 6/2808 385/24 |
| 2015/0037046 A1 | 2/2015 | Chan et al. | |
| 2015/0346427 A1* | 12/2015 | Kazakevich | A61B 1/0607 362/553 |
| 2016/0085027 A1 | 3/2016 | Chan et al. | |

\* cited by examiner

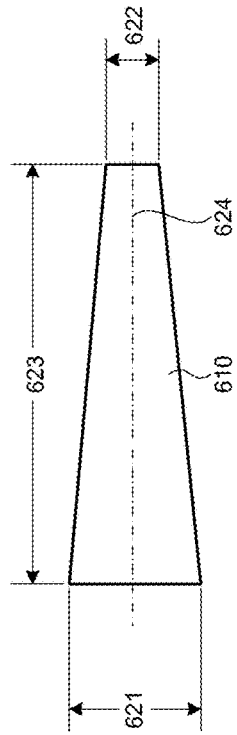
FIG. 2A
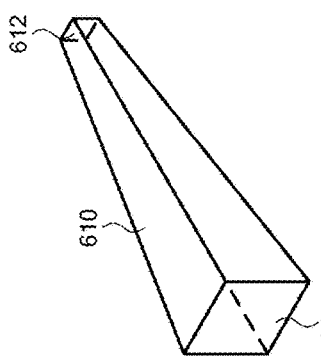
FIG. 2B
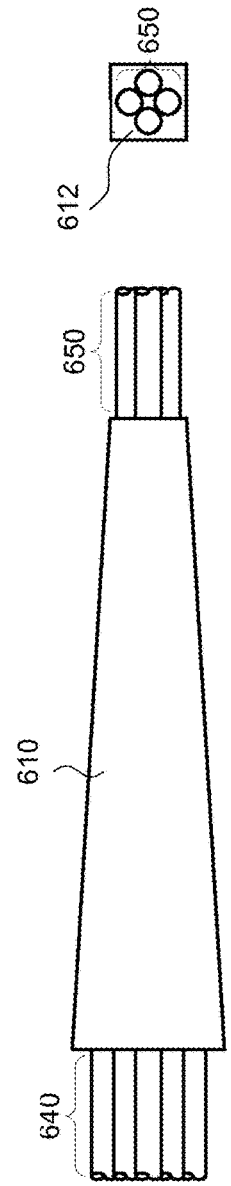
FIG. 3B
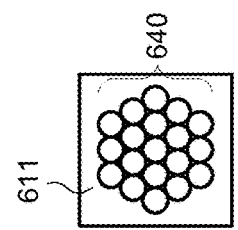
FIG. 3C
FIG. 3A

FIBER OPTICAL SYSTEM WITH FIBER END FACE AREA RELATIONSHIPS

BACKGROUND

The technology disclosed herein generally relates to optical networks that enable communication between electrical components.

Optical networking using plastic optical fibers may provide advantages over networking using copper or other metal wiring. Categories of plastic optical fiber include plastic-clad silicon optical fiber, single-core plastic optical fiber, or multi-core plastic optical fiber. Plastic optical fiber networking may have lower installation and maintenance costs. Moreover, because plastic optical fibers are lighter than the metal wiring that would be needed to carry an equivalent amount of data, using plastic optical fibers may result in appreciable weight savings. The weight savings may be significant for networks onboard vehicles, such as aircraft, where the weight savings may result in reduced fuel consumption and lower emissions.

In some scenarios, it is desirable to connect a number of line replaceable units to each other. For example, a number of line replaceable units in the forward section of a vehicle (e.g., an aircraft) may need to be connected to a number of line replaceable units in the aft section of the vehicle. Connecting each line replaceable unit to every other line replaceable unit could result in an unreasonably large number of connections between line replaceable units. Additionally, many of the connections between line replaceable units may be long, resulting in optical losses. If all of these connections were in the form of copper wires, the resulting space and weight of the connections could be burdensome for the vehicle. Electrical data buses have been used to connect line replaceable units. A single optical data bus can eliminate some of the weight and size of electrical connections between line replaceable units. In general, optical communication fibers, such as glass optical fibers and plastic optical fibers, can be lighter and contained in smaller spaces than electrical wiring. However, implementing optical communication systems is not as simple as merely replacing all electric wiring with optical fibers.

Plastic optical fibers have high transmission capacity, excellent immunity to electromagnetic interference-induced noise, light weight, high mechanical strength, and outstanding flexibility. Due to these properties, plastic optical fibers are used in data communications, as well as decoration, illumination, and similar industrial applications. Plastic optical fibers are also larger in diameter as compared to glass optical fibers. Due to their larger diameters, plastic optical fibers have greater tolerance for fiber misalignment than glass optical fibers have. Because of this large misalignment tolerance, plastic optical fiber-based networks have lower maintenance and installation costs. In aerospace platforms, plastic optical fibers also greatly reduce the cost of connectors and transceiver components used in an avionics network.

Currently, some optical data bus architectures (e.g., an ARINC 629 plastic optical fiber (POF) data bus) employed in aircraft require an individually packaged optical-electrical media converter for each channel. They also require individually packaged passive optical star couplers. These individually packaged units are interconnected together by fully jacketed POF cables.

As used herein, the term "star coupler" comprises one or more devices of a type that receives a plurality of optical signals at an input face via respective input optical fibers and outputs respective portions of each received optical signal to each of a plurality of output optical fibers optically coupled to an output face of the device. Thus each output optical fiber receives respective input optical signals from all of the input optical fibers. It is known to combine two devices of this type to form a star coupler that can be optically coupled to the transmitters and receivers of a plurality of optical-electrical media converters to enable a plurality of electronic components (such as line replaceable units), which are respectively electrically connected to the optical-electrical media converters, to communicate with each other.

An existing solution uses dual symmetric star couplers having input and output faces optically coupled to 1-mm-diameter plastic optical fibers, which plastic optical fibers are also connected to transmitters and receivers of respective optical-electrical media converters. In a known case, each receiver of an optical-electrical media converter comprises a photodetector having a diameter less than 1 mm (e.g., 0.4 mm). Because the 1-mm-diameter output plastic optical fibers optically coupled to the receivers are larger than the photodetector, this mismatch produces an optical coupling loss.

There is a need for a solution that reduces, if not eliminates, optical coupling loss due to mismatched sizes of POF end faces and photodetectors incorporated in receivers of optical-electrical media converters.

SUMMARY

The subject matter disclosed in detail below is directed to an optical network that enables communication between electrical components such as line replaceable units on an aircraft. The optical network comprises at least one star coupler comprising a transmit optical mixer and a receive optical mixer, which optical mixers are connected to the transmitters and receivers respectively of a plurality of optical-electrical media converters. Each optical-electrical media converter comprises a respective receiver optically coupled to the receive optical mixer by way of output plastic optical fibers and a respective transmitter optically coupled to the transmit optical mixer by way of input plastic optical fibers. In accordance with embodiments that will be described in more detail below, the output plastic optical fibers attached to an output face of the receive optical mixer have a diameter less than the diameter of the input plastic optical fibers.

As used herein, the term "transmit optical mixer" means an optical mixer in which the attached input plastic optical fibers are optically coupled to transmitters. As used herein, the term "receive optical mixer" means an optical mixer in which the attached output plastic optical fibers are optically coupled to receivers. The term "asymmetric", as applied to optical mixers herein, means that the diameter of the input plastic optical fibers is different than the diameter of the output plastic optical fibers.

In accordance with the embodiments disclosed herein, the receive optical mixers are connected to 1-mm-diameter input plastic optical fibers and to smaller-diameter (i.e., less than 1 mm) output plastic optical fibers to enhance receiver sensitivity. As compared to symmetrical receive optical mixers connected to 1-mm-diameter plastic optical fibers only, the use of smaller-diameter output plastic optical fibers improves the receiver sensitivity by better matching to the diameter (in the disclosed example, 0.4 mm) of the photodetectors integrated into the receivers.

One aspect of the subject matter disclosed in detail below is a fiber optical system comprising: a mixing optical fiber having a first end face with a first area and a second end face with the first area; a first input plastic optical fiber having a first end face with the first area and a second end face with a second area less than the first area, the second end face of the first input plastic optical fiber being attached to a first portion of the first end face of the mixing optical fiber; a second input plastic optical fiber having a first end face with the first area and a second end face with a third area less than the first area, the second end face of the second input plastic optical fiber being attached to a second portion of the first end face of the mixing optical fiber; and a plurality of output plastic optical fibers having end faces with a fourth area less than the first area attached to the second end face of the mixing optical fiber. The sum of the second and third areas is preferably equal to the first area.

In accordance with some embodiments of the fiber optical system described in the preceding paragraph, the first input plastic optical fiber has a first side face that intersects the second end face of the first input plastic optical fiber, and the second input plastic optical fiber has a second side face that intersects the second end face of the second input plastic optical fiber. In these embodiments, the system further comprises a layer of index matching epoxy disposed between and bonding confronting portions of the first and second side faces with no metal layer therebetween.

Another aspect of the subject matter disclosed in detail below is a fiber optical system comprising: a mixing optical fiber having a first end face with a first area and a second end face with the first area; a combiner having an end face with a second area attached to the first end face of the mixing optical fiber; a first length of plastic optical fiber having a cross-sectional area equal to the first area and optically coupled to the combiner; a second length of plastic optical fiber having a cross-sectional area equal to the first area and optically coupled to the combiner; and a plurality of output plastic optical fibers having end faces with a third area less than the first area attached to the second end face of the mixing optical fiber. Preferably the second area is equal to the first area. In accordance with some embodiments of the fiber optical system described in the preceding paragraph, the combiner comprises first and second portions having respective end faces attached to the first end face of the mixing optical fiber, the first and second portions of the combiner being bonded together by a layer of index matching epoxy, the first length of plastic optical fiber being integrally formed with the first portion of the combiner and the second length of plastic optical fiber being integrally formed with the second portion of the combiner. In accordance with other embodiments, the combiner may be a separate optically transparent component having two input end faces attached to end faces of respective plastic optical fibers and an output end face attached to an end face of the mixing optical fiber. The mixing optical fiber preferably comprises a step-index plastic optical fiber.

A further aspect of the subject matter disclosed in detail below is a data communications system comprising: first and second pluralities of electrical devices configured for sending and receiving electrical signals representing data; a first plurality of optical-electrical media converters, each optical-electrical media converter of the first plurality of optical-electrical media converters comprising a respective transmitter that converts electrical signals received from a respective one of the first plurality of electrical devices into optical signals and a respective receiver that converts optical signals into electrical signals to be sent to the respective one of the first plurality of electrical devices; a second plurality of optical-electrical media converters, each optical-electrical media converter of the second plurality of optical-electrical media converters comprising a respective transmitter that converts electrical signals received from a respective one of the second plurality of electrical devices into optical signals and a respective receiver that converts optical signals into electrical signals to be sent to the respective one of the second plurality of electrical devices; a first plurality of input plastic optical fibers respectively optically coupled to the transmitters of the first plurality of optical-electrical media converters and having end faces with a first area; a second plurality of input plastic optical fibers respectively optically coupled to the transmitters of the second plurality of optical-electrical media converters and having end faces with the first area; a first plurality of output plastic optical fibers respectively optically coupled to the receivers of the first plurality of optical-electrical media converters and having end faces with a second area less than the first area; a second plurality of output plastic optical fibers respectively optically coupled to the receivers of the second plurality of optical-electrical media converters, each output plastic optical fiber having end faces with a third area less than the first area; a first optical star coupler comprising a first transmit optical mixer having an input face attached to the end faces of the first plurality of input plastic optical fibers and having an output face, a first receive optical mixer having an output face attached to the end faces of the first plurality of output plastic optical fibers, and a first wrap-around fiber optical path that has a first end face attached to the output face of the first transmit optical mixer and a second end face with a fourth area less than the first area attached to the first receive optical mixer; a second optical star coupler comprising a second transmit optical mixer having an input face attached to the end faces of the second plurality of input plastic optical fibers and having an output face, a second receive optical mixer having an output face attached to the end faces of the second plurality of output plastic optical fibers, and a second wrap-around fiber optical path that has a first end face attached to the output face of the second transmit optical mixer and a second end face with a fifth area less than the first area attached to the second receive optical mixer; a first fiber optical path that has a first end face attached to the output face of the first transmit optical mixer and a second end face with a sixth area less than the first area attached to the second receive optical mixer; and a second fiber optical path that has a first end face attached to the output face of the second transmit optical mixer and a second end face with a seventh area less than the first area attached to the first receive optical mixer. The first receive optical mixer comprises a first mixing optical fiber having a first end face with the first area attached to the second end faces of the first wrap-around plastic optical fiber and the second fiber optical path; and having a second end face with the first area attached to the end faces of the first plurality of output plastic optical fibers. The second receive optical mixer comprises a second mixing optical fiber having a first end face with the first area attached to the second end faces of the second wrap-around plastic optical fiber and the first fiber optical path; and having a second end face with the first area attached to the end faces of the second plurality of output plastic optical fibers. In accordance with some embodiments, the sum of the fourth and seventh areas and the sum of the fifth and sixth areas are respectively equal to the first area, the fourth and seventh areas are equal, and the fifth and sixth areas are not equal. Each of the receivers of the first and second pluralities of optical-electrical media converters comprises a respective photodetector having an eighth area which is less than the first area. In accordance with some embodiments, the first plurality of electronic devices are line replaceable units located in a forward section of an aircraft and the second plurality of electronic devices are line replaceable units located in an aft section of the aircraft.

Yet another aspect is a method for installing an optical mixer in an optical network, comprising: cutting a length of a first plastic optical fiber to form first and second end faces, each of the first and second end faces having a first area; shaping an end section of a second plastic optical fiber having a cross-sectional area equal to the first area to form a first side face that intersects and is perpendicular to a first end face having a second area which is less than the first area; shaping an end section of a third plastic optical fiber having a cross-sectional area equal to the first area to form a second side face that intersects and is perpendicular to a second end face having a third area which is less than the first area; bonding the first and second side faces of the second and third plastic optical fibers together using index matching epoxy; bonding the first and second end faces of the second and third plastic optical fibers to respective portions of the first end face of the length of the first plastic optical fiber using index matching epoxy; bonding the end faces of a plurality of fourth plastic optical fibers, each having a fourth area less than the first area, to respective portions of the second end face of the first plastic optical fiber using index matching epoxy; securing the length of the first optical fiber, respective portions of the end sections of the second and third plastic optical fibers, and a cladding section of the plurality of fourth plastic optical fibers inside a ferrule using potting optical epoxy; and connecting the second and third plastic optical fibers and the plurality of plastic optical fibers to respective other plastic optical fibers of the optical network. Preferably, the sum of the second and third areas is equal to the first area.

The optical networks disclosed herein are designed to enhance the optical link budget of the optical system and enable the optical system to achieve a target end-of-life optical power margin as required for the particular installation. The proposed design is low cost and manufacturable using commercial-of-the-shelf plastic optical fiber components and without using high-temperature fusing processes.

Other aspects of asymmetric receive optical mixers for use in optical networks are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale and the relative thicknesses of layers depicted in those diagrams does not precisely reflect the actual thicknesses.

FIGS. 2A and 2B are diagrams representing isometric and side views respectively of a tapered optical mixer in accordance with one embodiment.

FIGS. 3A, 3B and 3C are diagrams representing first end, side and second end views respectively of a tapered optical mixer of the type depicted in FIGS. 2A and 2B connected to plastic optical fibers at both ends.

Reference will hereinafter be made to the drawings in which similar elements in different drawings bear the same reference numerals.

DETAILED DESCRIPTION

Illustrative embodiments of optical networks are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various embodiments of a fiber optical network for enabling optical communication between line replaceable units on an aircraft will be described in detail below for the purpose of illustration. However, implementation of the fiber optical networks disclosed herein is not limited solely to the environment of an aircraft, but rather may be utilized in fiber optical networks onboard other types of vehicles or fiber optic networks.

It is known to interconnect line replaceable units on an aircraft using a fiber optical system comprising dual symmetrical star couplers. In some cases, the line replaceable units are connected to optical star couplers via plastic optical fibers. In this manner, the signals sent by each of the line replaceable units are received by all of the other line replaceable units. Some of the line replaceable units are separated by relatively long distances.

Figure 1:
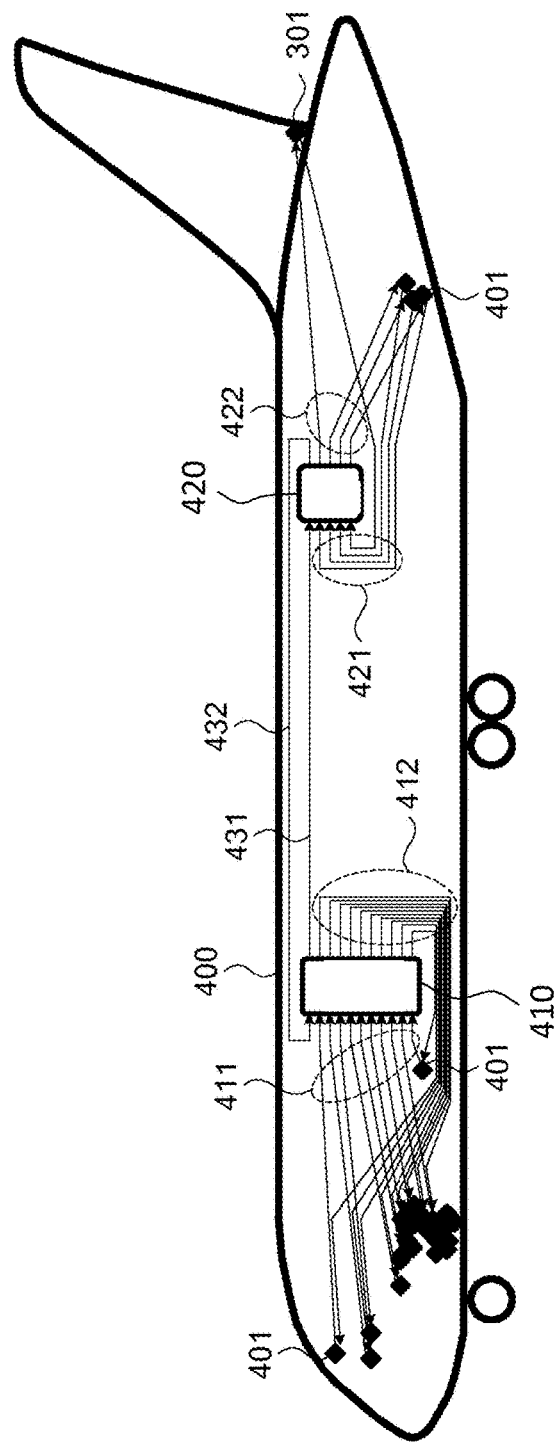
FIG. 1 is a diagram depicting an aircraft with a number of line replaceable units connected via a plastic fiber optical network having two symmetrical optical star couplers.

FIG. 1 depicts an aircraft 400 having a number of line replaceable units 401 onboard. For ease of depiction, not all of the line replaceable units 401 have been labeled. The aircraft vehicle includes an optical network that enables the line replaceable units 401 to communicate with each other. In accordance with the embodiment depicted in FIG. 1, the optical network comprises a forward star coupler 410 disposed in a forward section of the aircraft 400 and an aft star coupler 420 disposed in an aft section of the aircraft 400. The optical network further comprises the following: (a) plastic optical fiber transmission lines 411 from each media converter of the line replaceable units 401 in the forward section of the aircraft 400 to the forward star coupler 410; (b) plastic optical fiber receiving lines 412 connecting the forward star coupler 410 back to each media converter of the line replaceable units 401 in the forward section of the aircraft 400; (c) plastic optical fiber transmission lines 421 from each media converter of the line replaceable units 401 in the aft section of the aircraft 400 to the aft star coupler 420; (d) plastic optical fiber receiving lines 422 connecting the aft star coupler 420 back to each media converter of the line replaceable units 401 in the aft section of the aircraft 400; (e) a first long plastic optical fiber transmission line 431 connecting the forward star coupler 410 to the aft star coupler 420; and (f) a second long plastic optical fiber transmission line 432 connecting the forward star coupler 410 to the aft star coupler 420.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. Although optical fibers can be made of glass or plastic, this disclosure is directed to systems that employ plastic optical fibers.

In accordance with the embodiments disclosed herein, the forward star coupler 410 and the aft star coupler 420 each comprise a respective pair of tapered optical mixers. FIGS. 2A and 2B are diagrams representing isometric and side views respectively of an optical mixer 610 in accordance with one embodiment. The optical mixer 610 has a first face 611 and a second face 612. The size 621 of the first face 611 can be based on a number of optical fibers to be connected to the first face 611. The size 622 of the second face 612 can be based on a number of optical fibers to be connected to the second face 612. If the number of optical fibers to be connected to the first face 611 is different than the number of optical fibers to be connected to the second face 612, then the size of the first face 611 and the size of the second face 612 can be different, thereby giving the optical mixer 610 a tapered shape. The length 623 of the optical mixer 610 can be based on the sizes 621 and 622 of the faces 611 and 612. Each of the faces 611 and 612 can be substantially centered about an axis 624 that is substantially perpendicular to each of the two faces 611 and 612. The mixing rod 610 is preferably made of a material that has an index of refraction equal to the index of refraction of the plastic material of the plastic optical fibers connected to the optical mixer 610.

FIGS. 3A, 3B and 3C are diagrams representing first end, side and second end views respectively of a tapered optical mixer 610 of the type depicted in FIGS. 2A and 2B connected to plastic optical fibers at both ends. More specifically, a first set of optical fibers 640 are attached to a first face 611 of the optical mixer 610 and a second set of optical fibers 650 attached to a second face 612 of the optical mixer 610. The sizes of the faces 611 and 612 and the length of the optical mixer 610 can be determined such that light entering from any one of the first set of optical fibers 640 will be distributed substantially uniformly across the second face 612 while light entering from any one of the second set of optical fibers 650 will be distributed substantially uniformly across the first face 611. In this manner, when an optical signal enters one face of the optical mixer 610 from an optical fiber, the same optical signal is transmitted to all of the optical fibers attached to the opposite face of the optical mixer 610.

In the example shown in FIG. 3A, the number of optical fibers 640 is nineteen; in the example shown in FIG. 3C, the number of optical fibers 650 is four. However, typically the number of optical fibers 640 can vary from seven to forty, while the number of optical fibers 650 can vary from two to four.

The first and second sets of optical fibers 640 and 650 can be aligned to the respective faces 611 and 612 of the optical mixer 630 to optimize coupling. After alignment, the first and second sets of optical fibers 640 and 650 can be attached to the respective faces 611 and 612 of the optical mixer 610 with an index-matching ultraviolet light-curable adhesive. The completed assembly of optical fibers 640 and 650 and optical mixer 610 can be packaged in a protective housing. Connectors can be used to mate with the optical fibers inside the packaged protective housing with external optical fibers.

Figure 4:
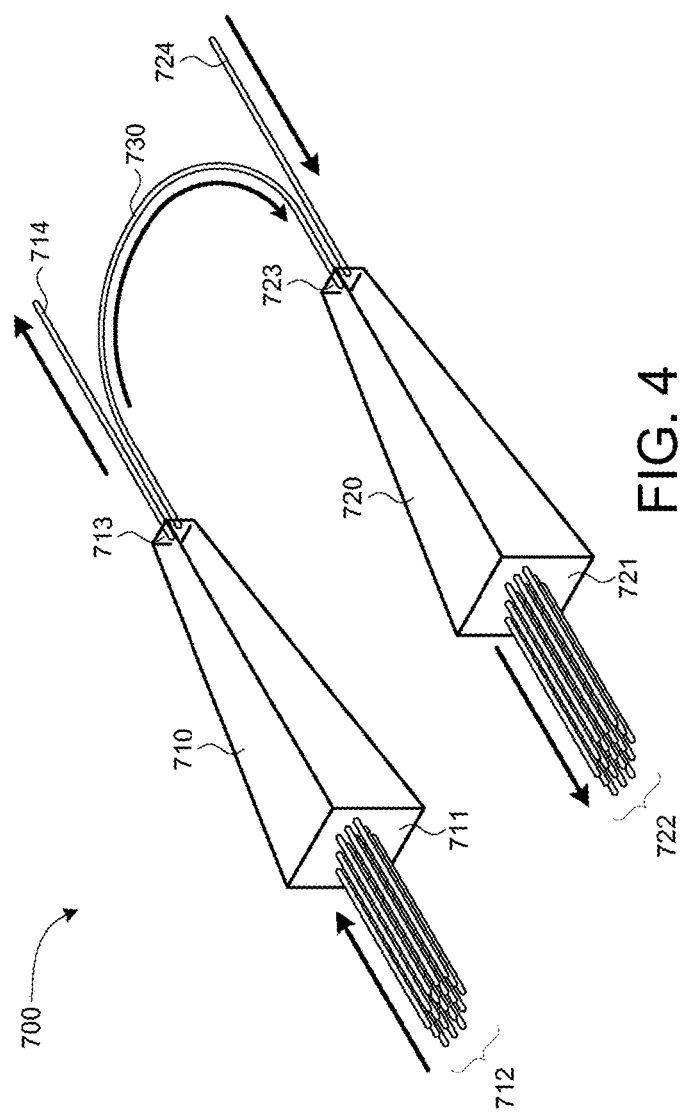
FIG. 4 is a diagram representing an isometric view of a portion of an optical network comprising a pair of tapered optical mixers which are optically coupled to each other.

FIG. 4 is a diagram representing an isometric view of a portion of an optical network comprising a pair of tapered optical mixers 710 and 720 which are optically coupled to each other by an optical fiber 730. Optical mixer 710 has a first face 711 with a first set of optical fibers 712 attached thereto and a second face 713 with optical fibers 714 and 730 attached thereto. Similarly, optical mixer 720 has a first face 721 with a second set of optical fibers 722 attached thereto and a second face 723 with optical fibers 724 and 730 attached thereto. The optical mixer 710 can uniformly distribute light from optical signals received from the first set of optical fibers 712 across the second face 713 such that the optical signals entering optical fibers 714 and 730 are a combination of all of the optical signals received from the first set of optical fibers 712. In addition, the optical fiber 714 can be connected to one of another pair of optical mixers (not shown). In addition, the optical fiber 730 can carry the combination of optical signals received from the first set of optical fibers 712 to the second face 723 of optical mixer 720. Optical fiber 724 can also carry an optical signal from one of the other pair of optical mixers (not shown). The optical mixer 720 can uniformly distribute light from the optical signals received from optical fibers 724 and 730 across the first face 721 such that optical signals entering the second set of optical fibers 722 are a combination of all of the optical signals received from optical fibers 724 and 730.

Figure 5:
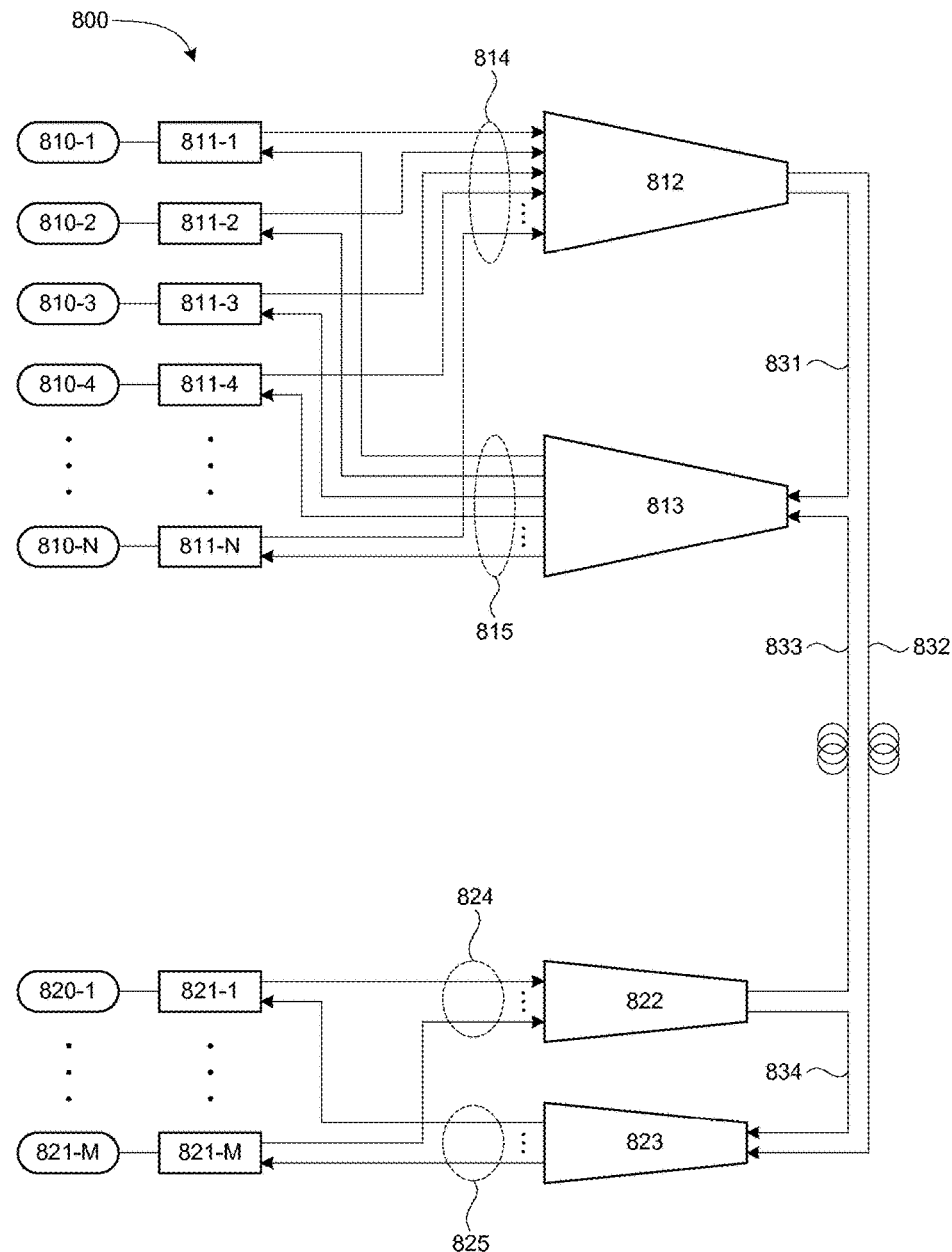
FIG. 5 is a schematic representation of an optical network that includes two pairs of tapered optical mixers in accordance with one embodiment.

FIG. 5 is a schematic representation of an optical network 800 that includes four optical mixers 812, 813, 822 and 823 in accordance with one embodiment. The optical network 800 comprises a first plurality of optical-electrical media converters 811-1 to 811-N (i.e., the number of optical-electrical media converters in the first plurality is N) which are: (a) respectively electrically coupled to a first plurality of N line replaceable units 810-1 to 810-N; (b) optically coupled to optical mixer 812 by way of plastic optical fibers 814; and (c) optically coupled to optical mixer 813 by way of plastic optical fibers 815. Each optical-electrical media converter of the first plurality comprises: (a) a respective transmitter (not shown in FIG. 5) that has a laser for converting electrical signals received from a respective line replaceable unit into optical signals to be sent to optical mixer 812; and (b) a respective receiver (not shown in FIG. 5) that has a photodetector that converts optical signals received from optical mixer 813 into electrical signals to be sent to a respective line replaceable unit.

The optical network 800 further comprises a second plurality of M optical-electrical media converters 821-1 to 821-M (i.e., the number of optical-electrical media converters in the second plurality is M) which are: (a) respectively electrically coupled to a second plurality of M line replaceable units 820-1 to 820-M; (b) optically coupled to optical mixer 822 by way of plastic optical fibers 824; and (c) optically coupled to optical mixer 823 by way of plastic optical fibers 825. Each optical-electrical media converter of the second plurality comprises: (a) a respective transmitter (not shown in FIG. 5) that has a laser for converting electrical signals received from a respective line replaceable unit into optical signals to be sent to optical mixer 822; and (b) a respective receiver (not shown in FIG. 5) that has a photodetector for converting optical signals received from optical mixer 823 into electrical signals to be sent to a respective line replaceable unit.

The optical network 800 depicted in FIG. 5 further comprises optical fibers 831, 832, 833 and 834. The optical fiber 831 is connected to enable the propagation of optical signals from the smaller end of optical mixer 812 to the smaller end of optical mixer 813. The optical fiber 832 is connected to enable the propagation of optical signals from the smaller end of optical mixer 812 to the smaller end of optical mixer 823. The optical fiber 833 is connected to enable the propagation of optical signals from the smaller end of optical mixer 822 to the smaller end of optical mixer 813. The optical fiber 834 is connected to enable the propagation of optical signals from the smaller end of optical mixer 822 to the smaller end of optical mixer 823. In accordance with the optical network 800 depicted in FIG. 5, each signal sent by any one of line replaceable units is received by all of the other line replaceable units.

In the embodiment depicted in FIG. 5, the first and second optical mixers 812 and 813 are configured to be connected to N optical fibers on one end and to two optical fibers on the other end. Such optical mixers can be referred to as 2×N optical mixers. The third and fourth optical mixers 822 and 823 are configured to be connected to M optical fibers on one end and to two optical fibers on the other end. Such optical mixers can be referred to as 2×M optical mixers.

In one example, an electrical signal is sent by line replaceable unit 810-1 to optical-electrical media converter 811-1, which converts the electrical signal into an optical signal that is sent to optical mixer 812 via one of the optical fibers 814. From the optical mixer 812, the optical signal is sent to optical mixers 813 and 823 via optical fibers 831 and 832 respectively. The second optical mixer 813 receives the optical signal via optical fiber 831 and sends that optical signal along each of the optical fibers 815 to the first plurality of optical-electrical media converters 811-1 to 811-N. Those optical signals are converted into electrical signals and sent to respective ones of the first plurality of line replaceable units 810-1 to 810-N. In the meantime, the fourth optical mixer 823 receives the optical signal from optical mixer 812 via optical fiber 832 and sends that optical signal along each of the optical fibers 825 to the second plurality of optical-electrical media converters 821-1 to 821-M. The optical signals are converted into electrical signals and sent to respective ones of the second plurality of line replaceable units 820-1 to 820-M.

Figure 6:
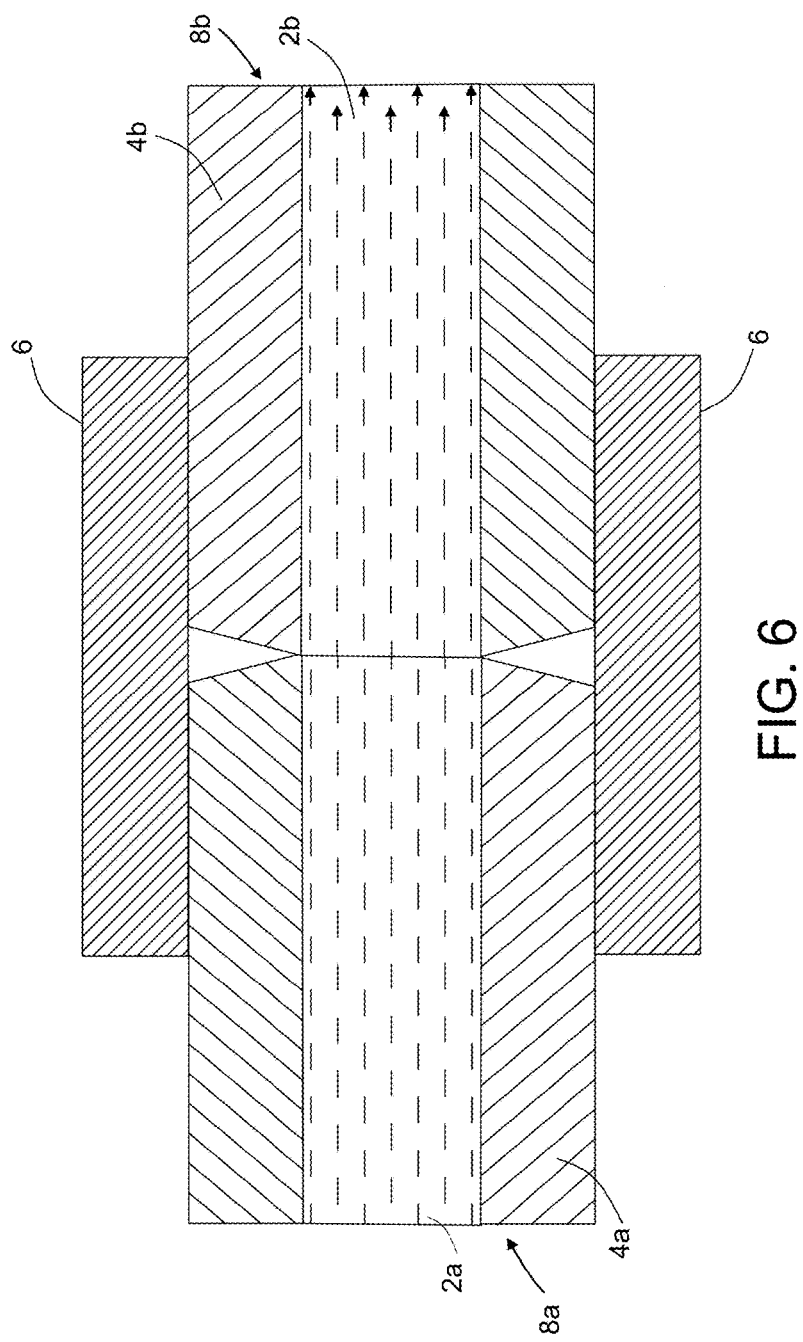
FIG. 6 is a diagram representing a sectional view of an optical coupling of two optical fibers using a connector.

Due to the long length of some of the fiber optical paths connecting the forward and aft star couplers, it is common to use connectors to optically couple a plurality of shorter-length plastic optical fibers in series. FIG. 6 is a sectional view depicting an optical coupling of one end of a first fiber optic device 8a to one end of a second fiber optic device 8b using a connector 6. The first fiber optic device 8a comprises a plastic optical fiber 2b surrounded by a ferrule 4b made of metal (e.g., stainless steel or aluminum) or ceramic, while the second fiber optic device 8b comprises a plastic optical fiber 2a surrounded by a ferrule 4a made of metal or ceramic. It is well known that each plastic optical fiber depicted in FIG. 6 (and other drawings) comprises a polymeric core (e.g., made of PMMA) surrounded by fluorinated polymeric cladding. In the example depicted in FIG. 6, the plastic optical fibers 2a and 2b have substantially the same diameter. Therefore, rays of light (represented by dashed arrows) propagating from left to right (as seen in FIG. 6)

along plastic optical fiber 2a can pass into plastic optical fiber 2b with a small optical coupling loss.

Many different types of optical fiber connectors exist and are commercially available. Accordingly, FIG. 6 does not seek to depict any particular configuration or type of optical fiber connector, but rather simply represents (in section) a generic connector as a generally circular cylindrical structure. In addition, it is well known that some connectors include springs and associated structure for pushing the ends of two fiber optic devices into contact with each other. Such springs and associated structure are also not shown in FIG. 6.

The connector's optical coupling loss depends on the quality of the confronting (in this example, also abutting) end faces of the plastic optical fibers (POF) 2a and 2b. A poor POF end face can introduce an additional optical loss per connector. The provision of smooth POF end faces is important to reduce the connector's optical coupling loss for avionics POF networks where the optical link budget is very tight due to relatively long POF lengths.

During the movements of a vehicle such as an aircraft, vibrations occur in various components at various vibration amplitudes and frequencies. In cases where two components are in contact, vibrations can cause those components to rub against each other. In cases where the two components are made of plastic, the rubbing surfaces of the two components may become scratched or develop other defects. To avoid such damage, it is desirable to provide a fiber optic system in which an air gap is present between the confronting end faces of the plastic optical fibers 2a and 2b seen in FIG. 6. This can be accomplished by polishing the end faces of the fiber optic devices 8a and 8b so that the end faces of the ferrules 4a and 4b abut while the end faces of the plastic optical fibers 2a and 2b are separated by an air gap, as disclosed in U.S. patent application Ser. No. 15/161,552.

Figure 7:
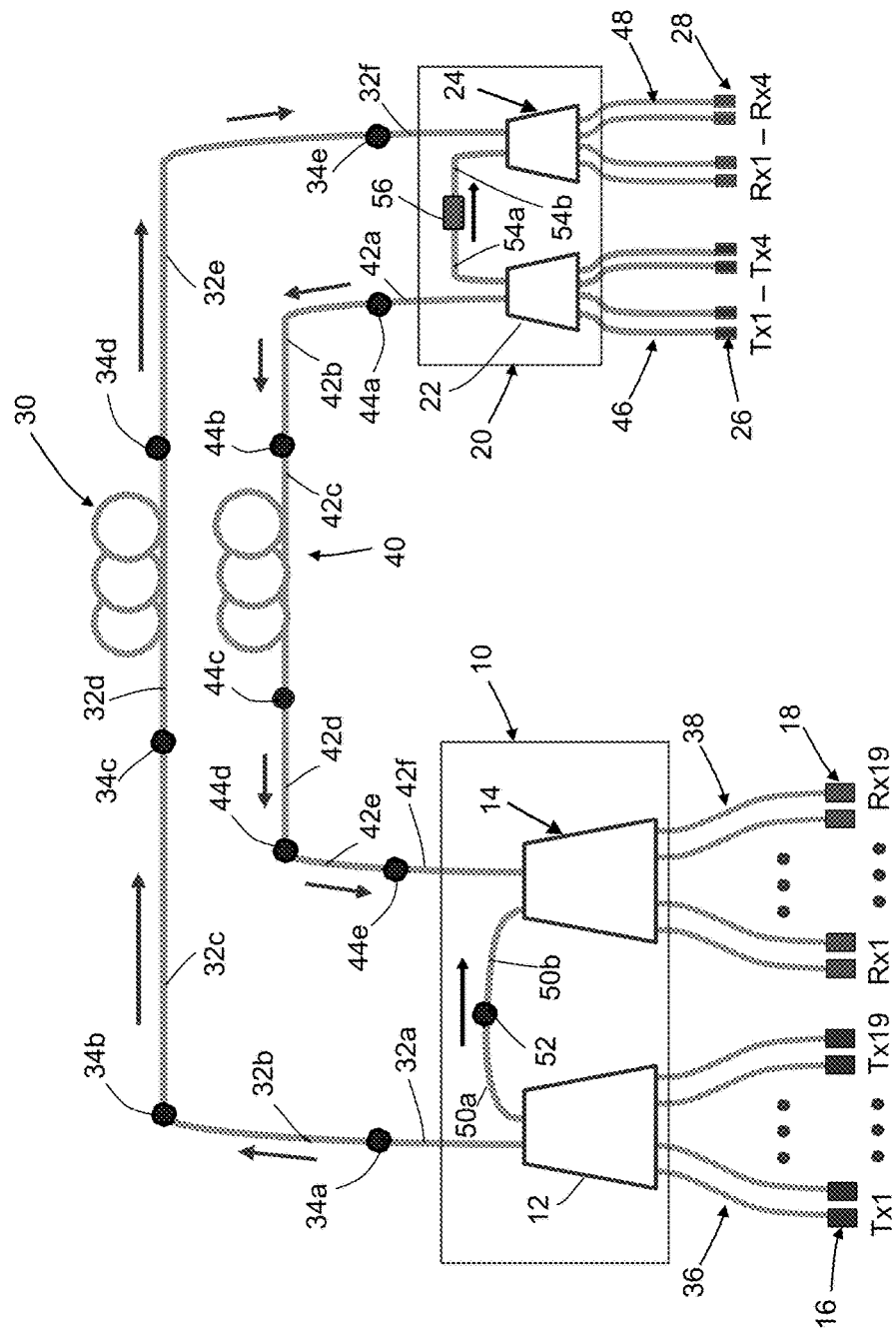
FIG. 7 is a diagram showing an optical network configuration in accordance with one embodiment with five connector breaks between the forward and aft star couplers.

FIG. 7 is a diagram showing a configuration of an optical network in accordance with one embodiment with five connector breaks in each of two fiber optical paths 30 and 40 connecting a forward star coupler 10 to an aft star coupler 20. The forward star coupler 10 comprises a 24×2 transmit optical mixer 12 and a 2×24 receive optical mixer 14. The aft star coupler 20 comprises a 4×2 transmit optical mixer 22 and a 2×4 receive optical mixer 24. The optical mixers are made of optically transparent material.

Still referring to FIG. 7, an input face of the 24×2 transmit optical mixer 12 is connected to respective transmitters Tx1-Tx19 of a plurality of transmitters 16 by respective plastic optical fibers 36, while an output face of the 2×24 receive optical mixer 14 is connected to respective receivers Rx1-Rx19 of a plurality of receivers 18 by respective plastic optical fibers 38. Each of the pluralities of receivers 18 may be a monolithic receiver integrated circuit (IC) chip packaged inside a metal cap (further described below with reference to FIG. 9). The transmitters 16 and the receivers 18 are paired in respective forward optical-electrical media converters. For example, transmitter Tx1 and receiver Rx1 are incorporated in a first forward optical-electrical media converter electrically coupled to a first forward line replaceable unit (not shown in FIG. 7); transmitter Tx2 and receiver Rx2 are incorporated in a second forward optical-electrical media converter electrically coupled to a second forward line replaceable unit (not shown in FIG. 7); and so forth. The nineteen pairs of transmitters/receivers (Tx1-Tx19/Rx1-Rx19) of the forward optical-electrical media converters form nineteen channels, eighteen active channels and one spare, each channel being coupled to a respective line replaceable unit disposed in the forward section of the aircraft.

Similarly, an input face of the 4×2 transmit optical mixer 22 is connected to respective transmitters Tx1-Tx4 of a plurality of transmitters 26 by respective plastic optical fibers 46, while an output face of the 2×4 receive optical mixer 24 is connected to respective receivers Rx1-Rx4 of a plurality of receivers 28 by respective plastic optical fibers 48. The transmitters 26 and the receivers 28 are paired in respective aft optical-electrical media converters. For example, transmitter Tx1 and receiver Rx1 are incorporated in a first aft optical-electrical media converter electrically coupled to a first aft line replaceable unit (not shown in FIG. 7); transmitter Tx2 and receiver Rx2 are incorporated in a second aft optical-electrical media converter electrically coupled to a second aft line replaceable unit (not shown in FIG. 7); and so forth. The four pairs of transmitters/receivers (Tx1-Tx4/Rx1-Rx4) of the aft optical-electrical media converters form four channels, three active channels and one spare, each channel being coupled to a respective line replaceable unit disposed in the aft section of the aircraft.

In the optical network depicted in FIG. 7, the output face of the 24×2 transmit optical mixer 12 is optically coupled to the input face of the 2×4 receive optical mixer 24 by fiber optical path 30, while the output face of the 4×2 transmit optical mixer 22 is optically coupled to the input face of the 2×24 receive optical mixer 14 by fiber optical path 40. The fiber optical path 30 comprises six plastic optical fibers 32a-32f optically coupled in series by five connectors 34a-34e, while the fiber optical path 40 comprises six plastic optical fibers 42a-42f optically coupled in series by five connectors 44a-44e. In addition, the output face of the 24×2 transmit optical mixer 12 is optically coupled to the input face of the 2×24 receive optical mixer 14 by plastic optical fibers 50a and 50b connected by a connector 52, while the output face of the 4×2 transmit optical mixer 22 is optically coupled to the input face of the 2×4 receive optical mixer 24 by plastic optical fibers 54a and 54b connected by an optical attenuator 56.

A computer simulation determined that with the transmitter optical output power and receiver sensitivity of the optical system shown in FIG. 7, taking into account POF optical loss and connector optical loss, an end-of-life optical link margin within the design target for a highly reliable fiber optic system in an avionics environment could be achieved. However, a subsequent review of the installation represented by the configuration depicted in FIG. 7 indicated that the lengths of the fiber optical paths 30 and 40 should be increased.

Figure 8:
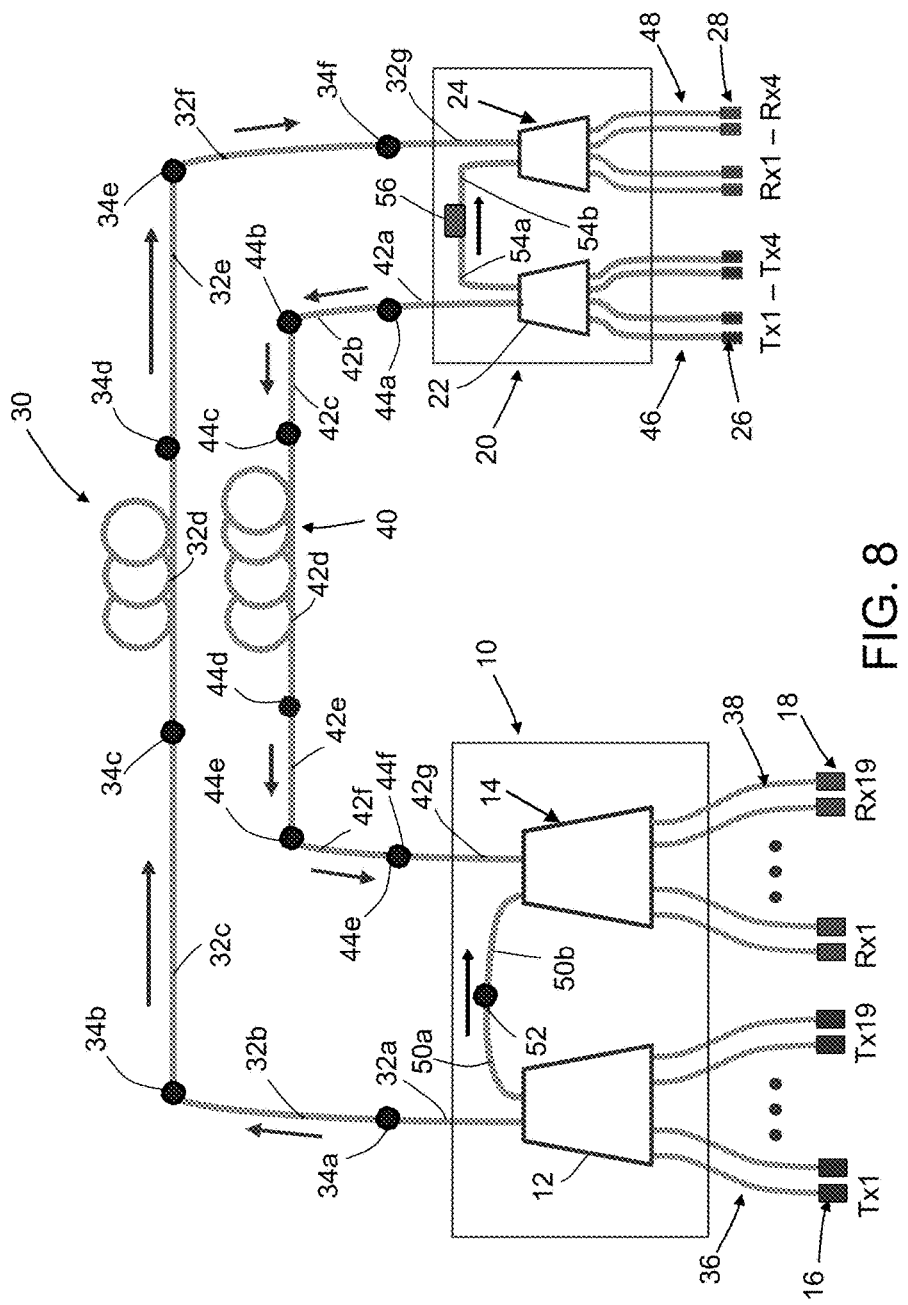
FIG. 8 is a diagram showing an optical network configuration in accordance with another embodiment with six connector breaks between the forward and aft star couplers.

To implement the proposed increase in length, it was determined that one connecter should be added to each of the fiber optical paths 30 and 40. The resulting configuration is depicted in FIG. 8, which is identical to FIG. 7 except that fiber optical path 30 has an additional (i.e., sixth) connector 34f and an additional (i.e., seventh) plastic optical fiber 32g, and that fiber optical path 40 has an additional (i.e., sixth) connector 44f and an additional (i.e., seventh) plastic optical fiber 42g. The plastic optical fiber 32g runs from the connector 34f to the input face of the receive optical mixer 24; the plastic optical fiber 42g runs from the connector 44f to the input face of the receive optical mixer 14, A computer simulation revealed that this increase in the number of POF links and connection breaks would reduce the end-of-line optical link margin of the system. Consequently, an effort was made to engineer a structural change that would increase the optical link margin to a higher level.

An analysis determined that the most reliable and robust approach for achieving the desired improvement in the optical link budget would be to enhance the receiver sensitivity.

Figure 9:
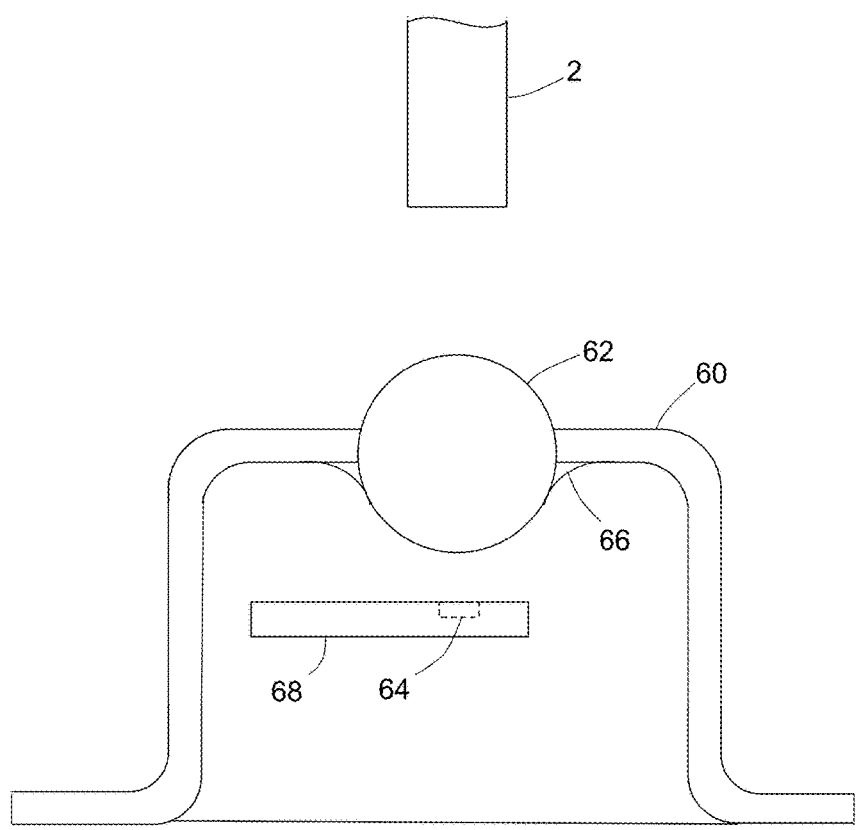
FIG. 9 is a diagram showing one end of a 1-mm-diameter plastic optical fiber optically coupled to a 0.4-mm-diameter photodetector of a receiver by way of a ball lens soldered to a cap.

FIG. 9 is a diagram showing one end of a 1-mm-diameter output plastic optical fiber 2 optically coupled to a 0.4-mm-diameter photodetector 64 of a monolithic receiver IC chip 68 by way of a ball lens 62 in accordance with one embodiment. The monolithic receiver IC chip 68 is packaged inside a metal cap 60. The top of the metal cap 60 has a circular aperture in which ball lens 62 is seated. The ball lens 62 is soldered in place (see solder 66). The monolithic receiver IC chip 68 has an integrated photodetector 64 in the form of a silicon PIN (p-type intrinsic n-type) detector. The receiver IC chip 68 is configured to function as a burst mode receiver that generates electrical signals based on the optical signals detected by the photodetector 64.

The purpose of integrating the receiver electronics and the photodetector 64 on the same chip is to reduce the size and maximize the signal-to-noise ratio. Because of this size limitation, the photodetector 64 in one commercially available receiver has a diameter of only 400 microns (0.4 mm). The ball lens 62 is the same commercially available receiver has a diameter of 2 mm. Coupling the 0.4-mm-diameter photodetector 64 to the 1-mm-diameter output plastic optical fiber 2 as depicted in FIG. 9 produces an optical coupling loss due to the mismatch in sizes. This optical coupling loss (OCL) can be calculated using the area mismatch ratio: OCL=10×Log [(0.4/1)$^2$] dB=–8 dB. This theoretical calculation shows an 8 dB optical loss in coupling each 1-mm-diameter output plastic optical fiber 2 to each 0.4-mm-diameter photodetector 64.

To compensate for the foregoing optical 8 dB coupling loss, the solution proposed herein is to substitute output plastic optical fibers having a diameter which is less than 1 mm and preferably less than 0.4 mm. Experimental results in coupling smaller-diameter output plastic optical fiber to a receiver having an integrated 0.4-mm-diameter photodetector showed an improvement in the receiver sensitivity. However, changing the output fiber size with the existing star coupler design depicted in FIGS. 10A and 10B was not feasible.

Figure 10A:
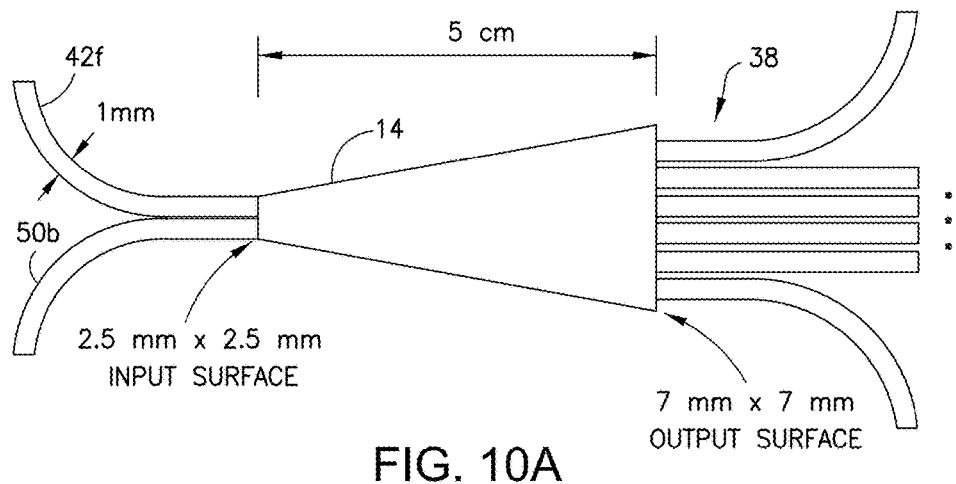
FIG. 10A is a diagram showing a tapered receive optical mixer of a forward star coupler, which receive optical mixer has a pair of 1-mm-diameter input plastic optical fibers which are attached to its input face and a plurality of output plastic optical fibers which are attached to its output face.

FIG. 10A shows a forward receive optical mixer 14 in the form of a 5-cm tapered glass mixing rod having two 1-mm-diameter input plastic optical fibers 42f and 50b attached to a 2.5 mm×2.5 mm input face and twenty-four 1-mm-diameter output plastic optical fibers 38 attached to a 7 mm×7 mm output face. Nineteen of the plastic optical fibers 38 are optically coupled to respective receivers (not shown in FIG. 10A) of respective optical electrical media converters located in the forward section of the aircraft. (When only nineteen of the twenty-four output plastic optical fibers are needed, the extra five can be cut off.)

Figure 10B:
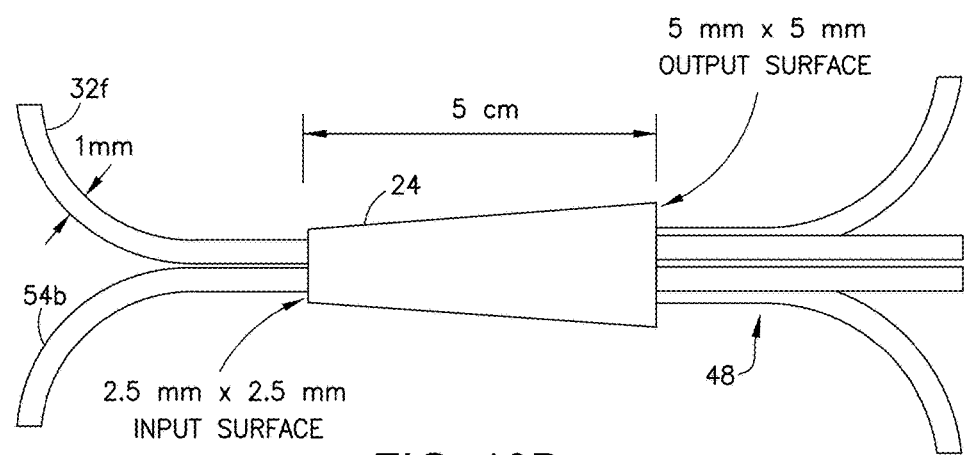
FIG. 10B is a diagram showing a tapered receive optical mixer of an aft star coupler, which receiving optical mixer has two 1-mm-diameter input plastic optical fibers which are attached to its input face and four 1-mm-diameter output plastic optical fibers which are attached to its output face.

Similarly, FIG. 10B shows an aft receive optical mixer 24 in the form of a 5-cm tapered glass mixing rod having two 1-mm-diameter input plastic optical fibers 32f and 54b attached to a 2.5 mm×2.5 mm input face and four 1-mm-diameter output plastic optical fibers 48 attached to a 5 mm×5 mm output face. The output plastic optical fibers 48 are optically coupled to respective receivers (not shown) of respective optical-electrical media converters located in the aft section of the aircraft.

The receive optical mixers 14 and 24 shown in FIGS. 10A and 10B are symmetrical POF couplers having input and output faces connected to 1-mm-diameter plastic optical fibers. This coupler design is very advantageous for the transmit optical mixers 12 and 22 (see FIG. 7) to maximize the coupling of the transmitter laser output power to the optical link. But for the receive optical mixers 14 and 24, each 1-mm-diameter output plastic optical fiber has a large mismatch with the aforementioned 0.40-mm-diameter photodetector in the respective receiver. However, decreasing the size of the output plastic optical fibers would create a large mismatch with the sizes of the output faces of the receive optical mixers 14 and 24.

The solution to this dilemma proposed herein is to design an asymmetric receive optical mixer that allows the use of output plastic optical fibers having a diameter less than the diameter of the input plastic optical fibers. Various embodiments, in which input plastic optical fibers have a diameter of 1 mm and output plastic optical fibers have various diameters less than 1 mm, will now be described. However, it should be appreciated that the concept disclosed herein does not require input plastic optical fibers having a diameter of 1 mm and photodetectors having a diameter of 0.4 mm. More generally, if the diameter $d_{input}$ of each input plastic optical fiber is greater than the diameter $d_{detector}$ of the photodetector, then the diameter $d_{output}$ of each output plastic optical fiber should be less than $d_{input}$ and preferably also equal to or less than $d_{detector}$.

Figure 11:
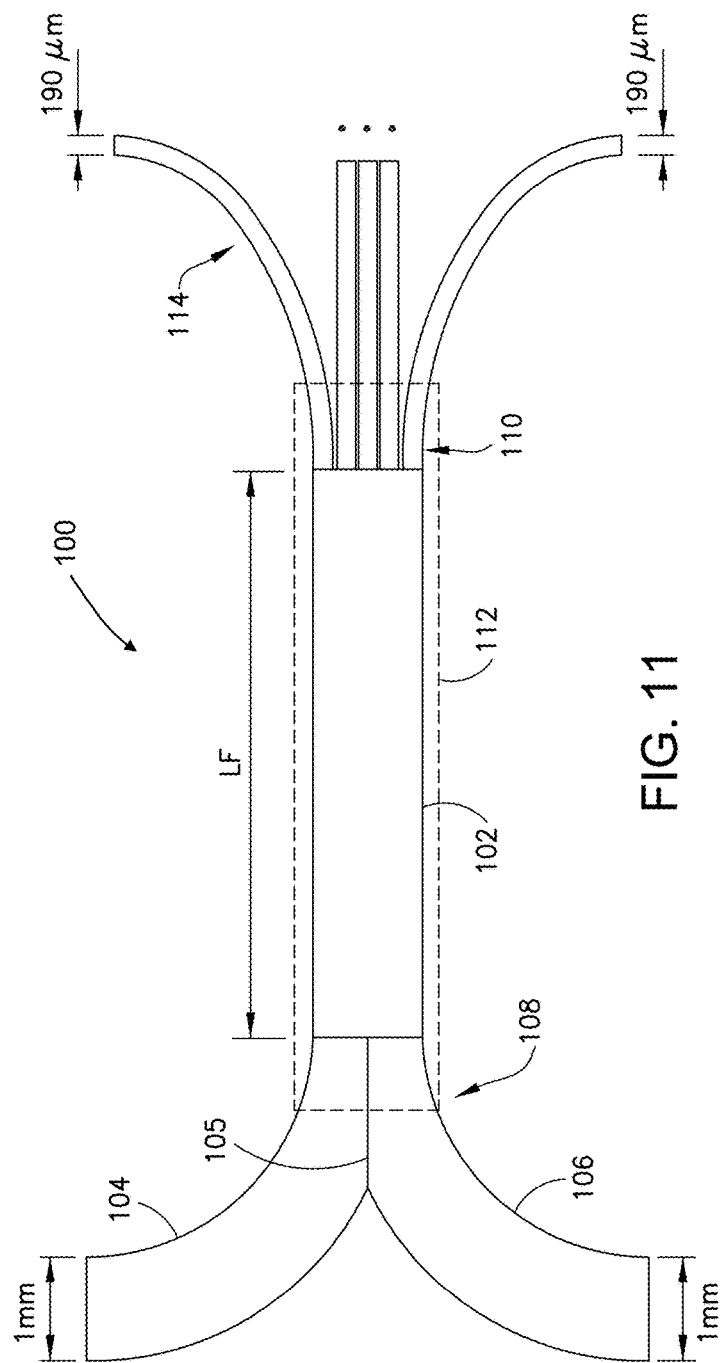
FIG. 11 is a diagram showing a forward receive optical mixer of a forward star coupler in accordance with one embodiment, which forward receive optical mixer comprises a 1-mm-diameter step-index plastic optical fiber having a pair of symmetric D-shaped end faces of respective input plastic optical fibers attached to its input end face and having end faces of a plurality of 190-µm-diameter output plastic optical fibers attached to its output end face.

FIG. 11 is a diagram showing a forward receive optical mixer 100 of a forward star coupler in accordance with one embodiment. This forward receive optical mixer 100 comprises a 1-mm-diameter step-index plastic optical fiber 102 having two D-shaped end faces of respective input plastic optical fibers 104 and 106 attached to its input end face and nineteen 190-µm-diameter output plastic optical fibers 114 attached to its output end face.

Figure 12:
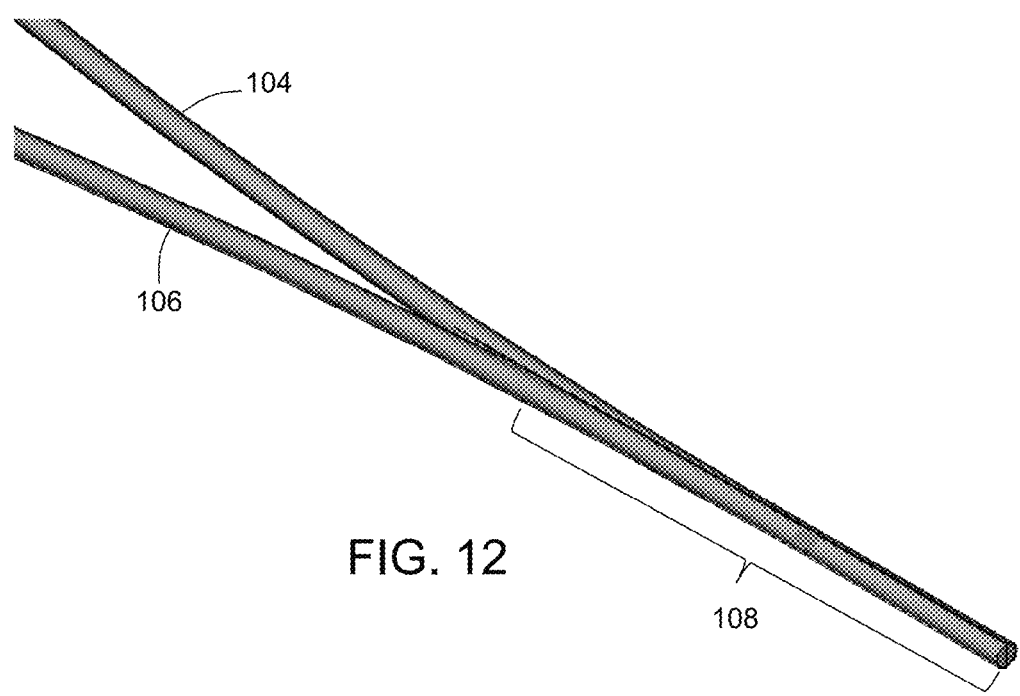
FIG. 12 is a diagram representing an isometric view of two plastic optical fibers converging to form a combiner in the optical mixer depicted in FIG. 11.
Figure 12A:
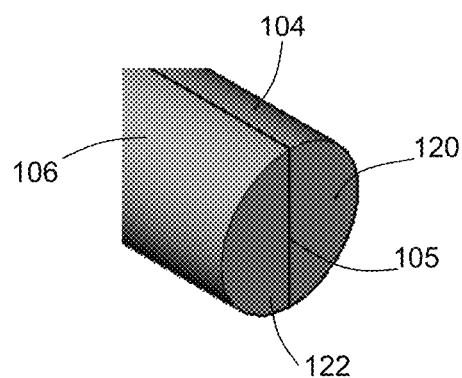
FIG. 12A is a magnified view of the end portion of the combiner depicted in FIG. 12.
Figure 12B:
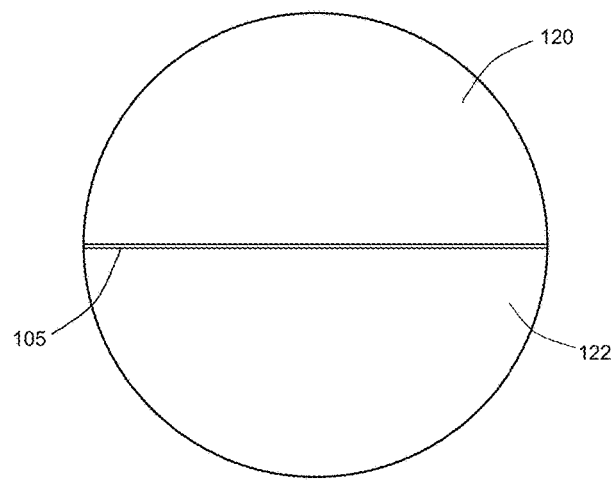
FIG. 12B is a diagram showing the semicircular end faces of the plastic optical fibers depicted in FIG. 12.

FIG. 12 is a diagram representing an isometric view of two input plastic optical fibers 104 and 106 converging to form a combiner 108 in the optical mixer depicted in FIG. 11. FIG. 12A is a magnified view of the end portion of the combiner 108 depicted in FIG. 12. The end sections of input plastic optical fibers 104 and 106 are bonded together using a layer of index matching epoxy 105 to form the combiner 108. FIG. 12B shows the semicircular end faces 120 and 122 of the plastic optical fibers depicted in FIG. 12. In this embodiment, each of the end faces 120 and 122 has a radius is equal to the radius (i.e., 0.5 mm) of the 1-mm-diameter step-index plastic optical fiber 102 seen in FIG. 11.

Referring again to FIG. 11, the input plastic optical fibers 104 and 106 comprise respective end sections (which end sections begin where the circular cross sections of input plastic optical fibers 104 and 106 transition to non-circular and terminate at the end faces 120 and 122) which are optically coupled and bonded to each other at an interface by the layer of index matching epoxy 105. These optically coupled end sections form the combiner 108, which will be treated as being part of the forward receive optical mixer 100 (another part being the aforementioned 1-mm-diameter step-index plastic optical fiber 102). The use of the modifier "forward receiver" in the name "forward receive optical mixer" indicates that the 190-µm-diameter output plastic optical fibers 114 (which each have one end optically coupled to the forward receive optical mixer) have other ends which are optically coupled to receivers (not shown) located in the forward section of the aircraft.

As seen in FIGS. 11, 12, and 12A, the end section of input plastic optical fiber 104 is shaped to form a first side face that intersects and is perpendicular to end face 120, while the end section of input plastic optical fiber 106 is shaped to form a second side face that intersects and is perpendicular to end face 122. These side faces are then bonded and optically coupled together by a layer of index matching epoxy 105.

In accordance with one implementation of the embodiment depicted in FIG. 11, the 1-mm-diameter step-index plastic optical fiber 102 is a standard high-temperature plastic optical fiber made of PMMA. The length LF of the 1-mm-diameter step-index plastic optical fiber 102 is preferably in the range of 5 to 10 cm for uniform mixing of the input optical signals during their propagation therethrough. The two input plastic optical fibers 104 and 106 have a diameter of 1 mm except in the respective end sections that form the combiner 108. The semicircular end faces 120 and 122 seen in FIG. 12 are attached to the circular input end face of the 1-mm-diameter step-index plastic optical fiber 102 seen in FIG. 11 using index matching epoxy. In accordance with one embodiment, each end face 120 and 122 is a semicircle having a radius equal to the radius (i.e., 0.5 mm) of the circular input end face of the 1-mm-diameter step-index plastic optical fiber 102.

In one implementation, the combiner 108 can have a length of about 8 mm or longer. The layer of index matching epoxy 105 (seen in FIG. 12) is used to bond confronting planar surfaces of the input plastic optical fibers 104 and 106 together (without a metal layer) for the purpose of enhancing the mixing uniformity of incoming two optical signals.

In accordance with an alternative embodiment, the combiner 108 may be a separate monolithic optical transparent element having two circular 1-mm-diameter input ends faces optically coupled to respective 1-mm-diameter input plastic optical fibers and one circular 1-mm-diameter output end face optically coupled to the input end face of the 1-mm-diameter step-index plastic optical fiber 102.

Figure 13:
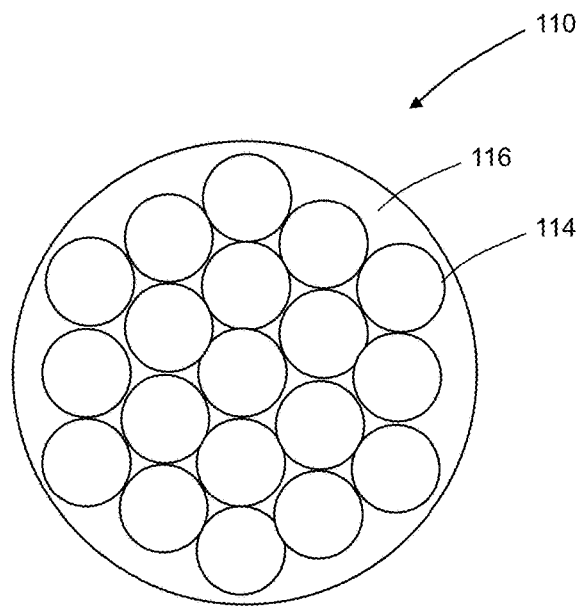
FIG. 13 is a diagram showing the shape of end faces of the plurality of 190-µm-diameter output plastic optical fibers depicted in FIG. 11.

In accordance with one implementation of the embodiment depicted in FIG. 11, a 1-mm-diameter multi-core plastic optical fiber bundle 110 comprising nineteen 190-μm-diameter step-index plastic optical fibers 114 bundled together is attached to the output end face of the 1-mm-diameter step-index plastic optical fiber 102. The input face of such a fiber bundle is shown in FIG. 13 (using circles that represent ideal, not real shapes of typical plastic optical fiber end faces). The nineteen 190-μm-diameter output plastic optical fibers 114 are bundled together in an outer cladding 116. The 190-μm-diameter step-index plastic optical fibers 114 of the 1-mm-diameter multi-core plastic optical fiber bundle 110 are easily separated by dissolving the outer cladding 116 of the fiber bundle using solvent or by mechanically peeling off the outer cladding 116.

Figure 14:
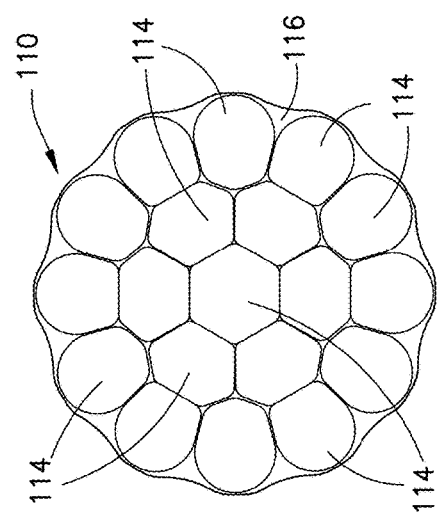
FIG. 14 is a diagram showing the true (not idealized) shapes of end faces of a plurality of 190-µm-diameter output plastic optical fibers of a commercially available multi-core plastic optical fiber bundle which can be attached to the output end face of the 1-mm-diameter step-index plastic optical fiber depicted in FIG. 11.
Figure 15:
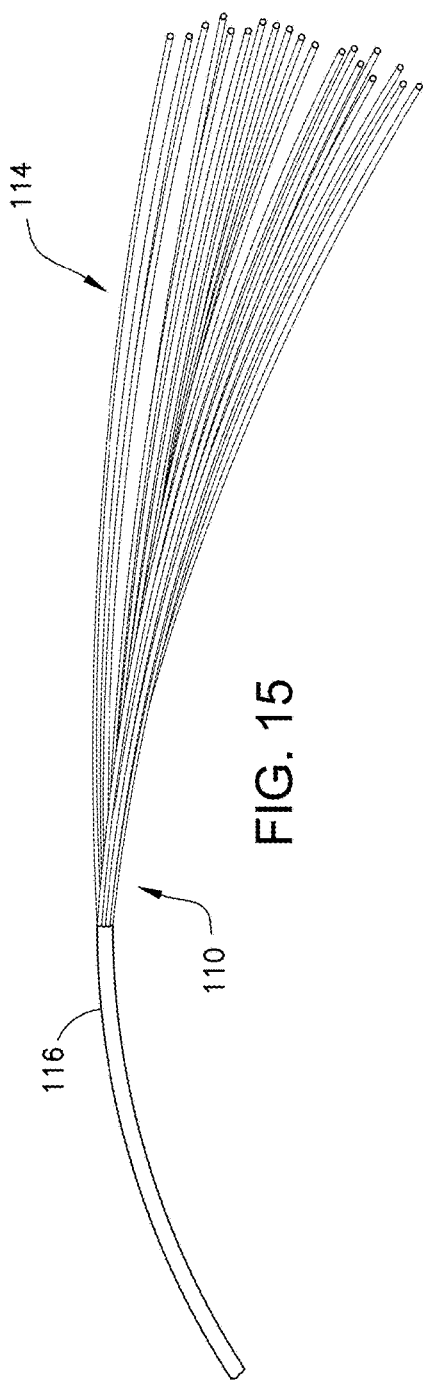
FIG. 15 is a diagram showing a multi-core plastic optical fiber bundle, a portion of which has been separated into individual plastic optical fibers by removal of the outer cladding of the fiber bundle.

FIG. 14 shows the true (not idealized) shapes of end faces of a plurality of 190-μm-diameter output plastic optical fibers of a commercially available multi-core plastic optical fiber bundle which can be attached to the output end face of the 1-mm-diameter step-index plastic optical fiber 102 depicted in FIG. 11. FIG. 15 is a diagram representing a portion of such a separable 1-mm-diameter multi-core plastic optical fiber bundle 110. This diagram shows the splayed ends of the nineteen 190-μm-diameter step-index plastic optical fibers 114 in a section where the outer cladding 116 has been removed.

Referring again to FIG. 11, a precision metal (or ceramic) ferrule 112 (indicated by a dashed rectangle) having an inner diameter of 1 mm is used to house the entire 1-mm-diameter step-index plastic optical fiber 102, a portion of the combiner 108, and a portion of the 1-mm-diameter multi-core plastic optical fiber bundle 110. (The 1-mm-diameter step-index plastic optical fiber 102 and the combiner 108 when attached to each other, form the forward receive optical mixer 100.) Additional potting optical epoxy is used to mount the 1-mm-diameter step-index plastic optical fiber 102 and the aforementioned portions of combiner 108 and 1-mm-diameter multi-core plastic optical fiber bundle 110 securely inside the ferrule 112. The outer cladding of that portion of the 1-mm-diameter multi-core plastic optical fiber bundle 110 which is disposed inside the ferrule 112 and not separated into individual fibers is not shown in FIG. 11.

Figure 16:
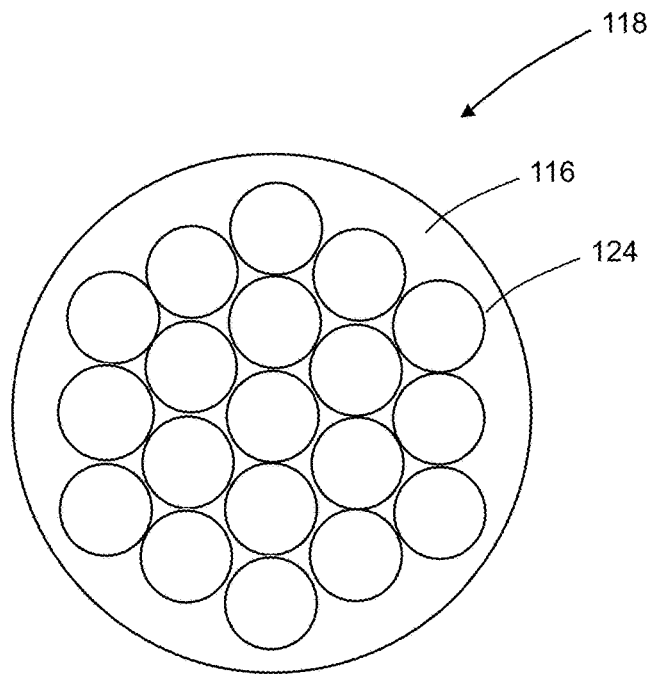
FIG. 16 is a diagram showing the shape of end faces of a plurality of 175-µm-diameter output plastic optical fibers which can be attached to the output end face of the 1-mm-diameter step-index plastic optical fiber depicted in FIG. 11 in accordance with a second embodiment.

An alternative to using the commercially available 1-mm-diameter multi-core plastic optical fiber 110 bundle is bundling nineteen small-diameter plastic optical fibers (commercially available individually) into the ferrule 112, which has an inner diameter of 1 mm. The most suitable individual single-core small-diameter plastic optical fiber is a 175-μm-diameter plastic optical fiber. FIG. 16 shows a fiber bundle 118 comprising nineteen 175-μm-diameter plastic optical fibers 124 bundled together by an outer cladding 116. The outer diameter of the outer cladding 116 can be 1 mm to match the inner diameter of the surrounding ferrule 112 shown in FIG. 11. Plastic optical fibers having a diameter of 175 μm are commercially available from Asahi Kasei Corporation, Tokyo, Japan.

Figure 17:
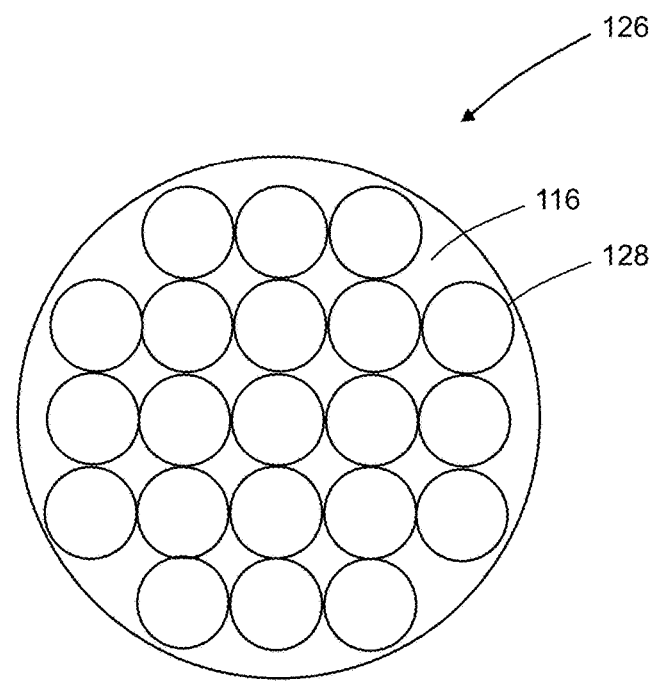
FIG. 17 is a diagram showing the shape of end faces of a plurality of 175-µm-diameter output plastic optical fibers which can be attached to the output end face of the 1-mm-diameter step-index plastic optical fiber depicted in FIG. 11 in accordance with a third embodiment.

If more than nineteen channels in the forward receive optical mixer 100 are needed, FIG. 17 shows that twenty-one individual 175-μm-diameter plastic optical fibers 128 can be fitted into a 1-mm ferrule. The end faces of the twenty-one individual 175-μm-diameter plastic optical fibers 128 can be attached to the output face of the 1-mm-diameter step-index plastic optical fiber 102 depicted in FIG. 11. With this 21-fiber option, the forward receive optical mixer 100 has the flexibility to have up to three spare channels. This will allow the forward star coupler to be implemented with 18 active receive channels and three spare receive channels.

FIGS. 11 through 17 show a design and an implementation for an asymmetric forward receive optical mixer to be connected to a plurality of receivers located in a forward section of an aircraft. This design increases the link budget for optical signals propagating from transmitters located in the aft section of the aircraft. Similar changes can be made to the design and implementation of the aft receive optical mixer.

Figure 18:
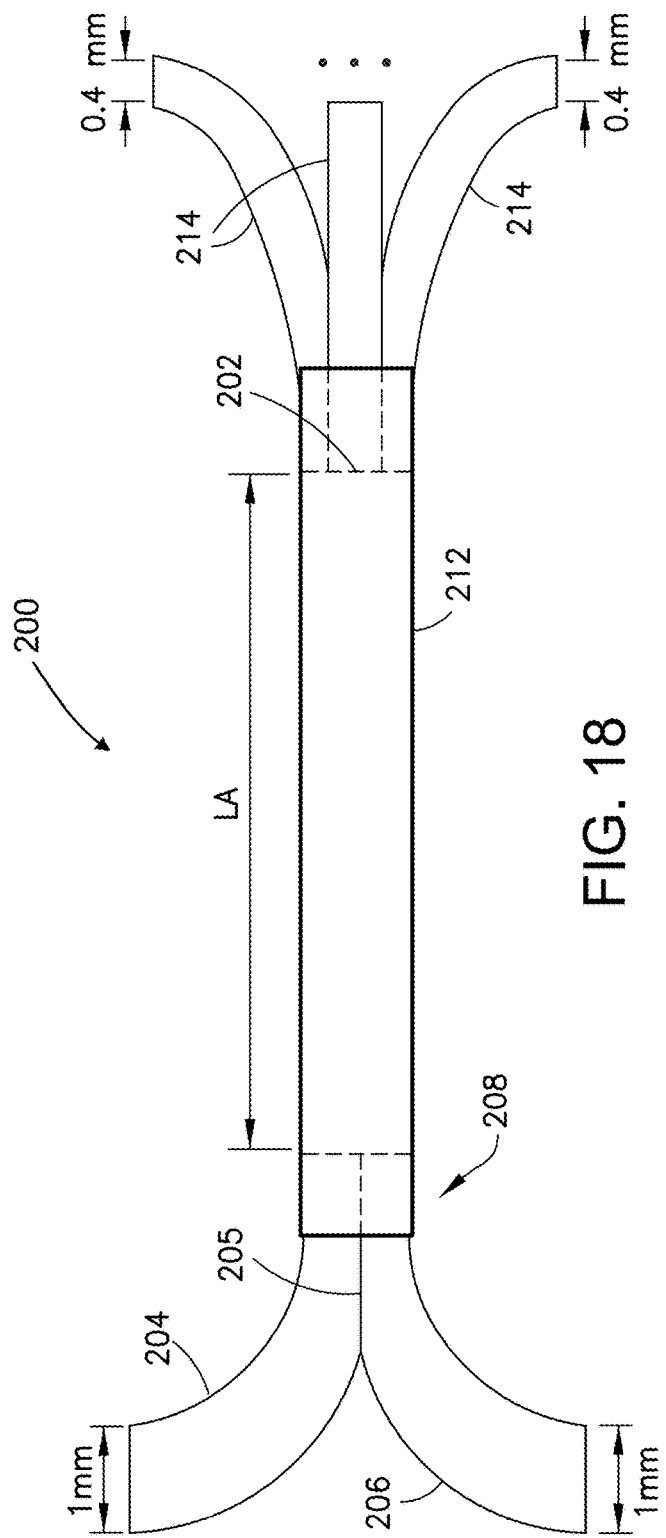
FIG. 18 is a diagram showing an aft receive optical mixer of an aft star coupler in accordance with one embodiment, which aft receive optical mixer comprises a 1-mm-diameter step-index plastic optical fiber having an input end face to which two asymmetric end faces of respective input plastic optical fibers are attached and an output end face to which the end faces of four 400-μm-diameter output plastic optical fibers are attached.
Figure 19:
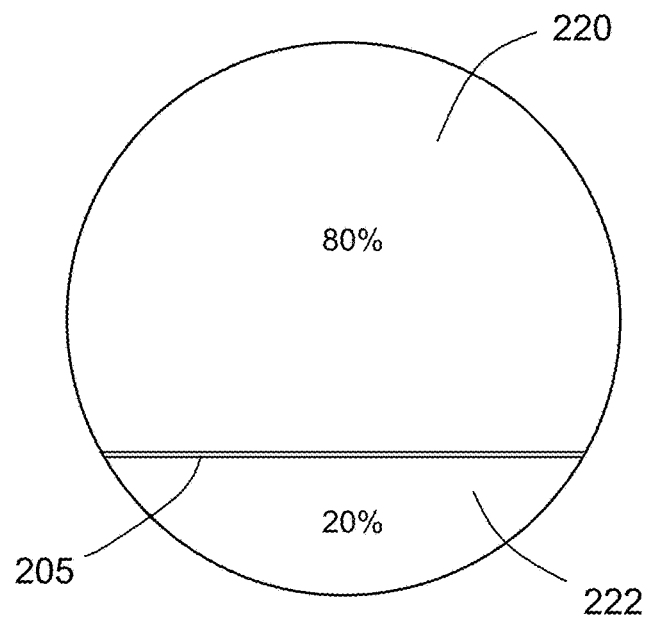
FIG. 19 is a diagram showing the two asymmetric end faces of the input plastic optical fibers depicted in FIG. 18.

FIG. 18 is a diagram showing an aft receive optical mixer 200 of an aft star coupler in accordance with one embodiment. This receive optical mixer 200 comprises a 1-mm-diameter step-index plastic optical fiber 202 having two D-shaped end faces of respective input plastic optical fibers 204 and 206 attached to its input end face and four 400-μm-diameter output plastic optical fibers 214 attached to its output end face. FIG. 19 shows two D-shaped end faces 220 and 222 which are complementary sections of a circle having a diameter of 1 mm. The areas of the end faces 220 and 222 meet along a chord of the circle, meaning that the confronting surfaces are planar.

To minimize the area mismatch loss, the optimum diameter of the four output plastic optical fibers 214 for use in aft receive optical mixer 200 is 400 microns (0.4 mm). 400-μm-diameter plastic optical fiber is one of the standard sizes of individual single-core plastic optical fiber that is commercially available. The 400-μm-diameter plastic optical fibers 214 also have a good match to the diameter of the previously described photodetector 64 of the receiver shown in FIG. 9.

Referring again to FIG. 18, the input plastic optical fibers 204 and 206 comprise respective end sections (which end sections begin where the circular cross sections of input plastic optical fibers 204 and 206 transition to non-circular and terminate at the end faces 220 and 222) which are optically coupled and bonded to each other at an interface by a layer of index matching epoxy 205. These optically coupled end sections form a combiner 208 which will be treated as being part of the aft receive optical mixer 200 (another part being the aforementioned 1-mm-diameter step-index plastic optical fiber 202). The use of the modifier "aft receiver" in the name "aft receive optical mixer" indicates that the 400-μm-diameter output plastic optical fibers 214 (which each have one end optically coupled to the aft receive optical mixer) have other ends which are optically coupled to receivers (not shown) located in the aft section of the aircraft.

As seen in FIG. 18, the end section of input plastic optical fiber 204 is shaped to form a first side face that intersects and is perpendicular to end face 220 (see FIG. 19), while the end section of input plastic optical fiber 206 is shaped to form a second side face that intersects and is perpendicular to end face 222 (see FIG. 19). These side faces are then bonded and optically coupled together by means of index matching epoxy 205.

In accordance with one implementation of the embodiment depicted in FIG. 18, the 1-mm-diameter step-index plastic optical fiber 102 is a standard high-temperature plastic optical fiber made of PMMA. The length LA of the 1-mm-diameter step-index plastic optical fiber 202 is preferably in the range of 5 to 10 cm for uniform mixing of the input optical signals during their propagation therethrough. The two input plastic optical fibers 204 and 206 have a diameter of 1 mm except in the respective end sections that form the combiner 208. The end faces 220 and 222 seen in FIG. 19 are attached to the circular output end face of the 1-mm-diameter step-index plastic optical fiber 202 seen in FIG. 18 using index matching epoxy. In accordance with one embodiment, each end face 220 and 222 is a section of a circle having a diameter of 1 mm.

With the selection of 400-μm-diameter plastic optical fiber for coupling to the output end face of the 1-mm-diameter step-index plastic optical fiber 202, an analysis was performed to determine whether the same 50/50 splitting combiner as shown in FIG. 11 could be used to form combiner 208. The analysis results indicated that the optical coupling loss was higher than a maximum allowable level.

As indicated by the internal architecture of the aft star coupler 20 shown in FIG. 8, a left input arm (i.e., the plastic optical fiber 54b) connects the aft receive optical mixer 24 to an optical attenuator 56, which in turn is connected to the aft transmit optical mixer 22 by a right output arm (i.e., the plastic optical fiber 54a). This connection is a local "wrap around" optical connection between the optical mixers inside the aft star coupler 20. Because of the high output power of the aft transmit optical mixer 22 and the low port count of the aft receive optical mixer 24, the optical attenuator 56 has a large attenuation. This provides an advantage of changing the splitting ratio of the combiner 208 to achieve lower optical coupling loss in the aft star coupler 20. By changing the combiner splitting ratio to 80/20 and lowering the attenuation of the optical attenuator 56, using plastic optical fiber 206 as the left input arm 54b of the aft receive optical mixer 24, and using plastic optical fiber 204 as the right input arm 32g of the aft receive optical mixer 24, a total loss lower than the maximum allowable level can be attained.

FIG. 19 shows the asymmetric end faces 220 and 222 of the 1-mm-diameter input plastic optical fibers 204 and 206. The end faces 220 and 222 are attached to the circular input end face of the 1-mm-diameter step-index plastic optical fiber 202 and are attached to each other by the layer of index matching epoxy 205. When viewed from the end, the interface 205 is defined by a chord that is located such that the ratio of the areas of end faces 220 and 222 is 80/20.

Figure 20:
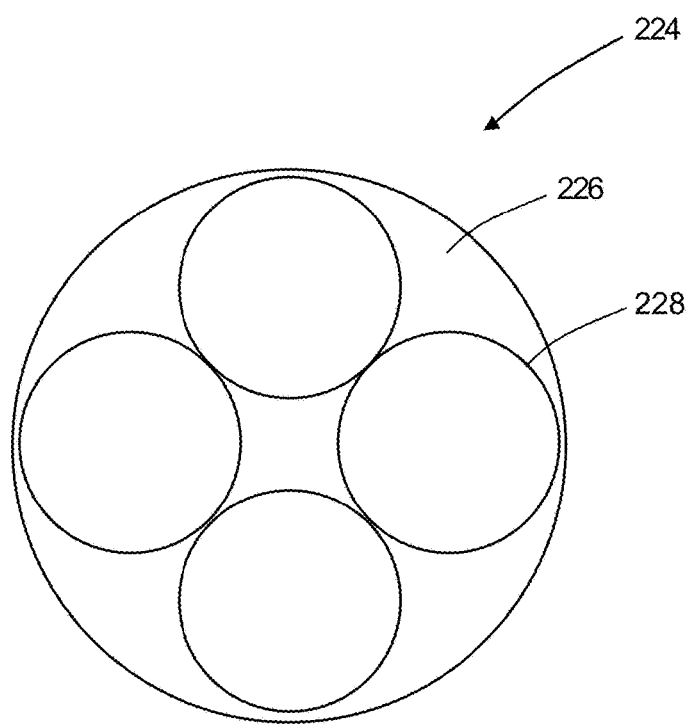
FIG. 20 is a diagram showing the end faces of the four 400-μm-diameter output plastic optical fibers depicted in FIG. 18.

FIG. 20 shows a fiber bundle 218 comprising four 400-μm-diameter plastic optical fibers 214 bundled together using potting optical epoxy 216. The outer diameter of the potting optical epoxy 216 is 1 mm to match the inner diameter of the surrounding ferrule 212 shown in FIG. 18. The end faces of the four 400-μm-diameter output plastic optical fibers 214 are attached to the output end face of the 1-mm-diameter step-index plastic optical fiber 202 depicted in FIG. 18.

Further increase in the splitting ratio of the combiner 208 to 90/10 would further reduce the optical coupling loss of the aft receive optical mixer 200. However, for splitting ratios larger than 80/20, the process for manufacturing the combiner becomes more difficult.

In summary, this disclosure has presented asymmetric plastic optical fiber star coupler designs that can be incorporated in an avionics system to increase the end-of-life optical link margin of the optical data bus, reducing the installation and maintenance cost and increasing the reliability of the system.

In accordance with one embodiment, an optical mixer of the type depicted in FIG. 11 can be installed in an optical network using a method comprising the following steps: cutting a length of a first plastic optical fiber 102 to form first and second end faces, each of the first and second end faces having a first area; shaping an end section of a second plastic optical fiber 104 having a cross-sectional area equal to the first area to form a first side face that intersects and is perpendicular to a first end face 120 having a second area which is less than the first area; shaping an end section of a third plastic optical fiber 106 having a cross-sectional area equal to the first area to form a second side face that intersects and is perpendicular to a second end face 122 having a third area which is less than the first area; bonding the first and second side faces of the second and third plastic optical fibers together using index matching epoxy 105; bonding the first and second end faces 120 and 122 of the second and third plastic optical fibers 104 and 106 to respective portions of the first end face of the length of the first plastic optical fiber 102 using index matching epoxy; bonding the end faces of a plurality of plastic optical fibers 114, each having a fourth area less than the first area, to respective portions of the second end face of the length of the first plastic optical fiber 102 using index matching epoxy; securing the length of the first plastic optical fiber 102, mixer 108 and cladding 110 inside a ferrule 112 using potting optical epoxy; and connecting the second and third plastic optical fibers 104 and 106 and the plurality of plastic optical fibers 114 to respective other components of the optical network. In the disclosed embodiments, the sum of the second and third areas is equal to the first area.

While optical networking systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A fiber optical system comprising:
a mixing optical fiber having a first end face with a first area and a second end face with the first area;

a first input plastic optical fiber having a first end face with the first area and a second end face with a second area less than the first area, the second end face of the first input plastic optical fiber being attached to a first portion of the first end face of the mixing optical fiber;

a second input plastic optical fiber having a first end face with the first area and a second end face with a third area less than the first area, the second end face of the second input plastic optical fiber being attached to a second portion of the first end face of the mixing optical fiber; and a plurality of output plastic optical fibers having end faces with a fourth area less than the first area attached to the second end face of the mixing optical fiber.

2. The fiber optical system as recited in claim 1, wherein the sum of the second and third areas is equal to the first area.

3. The fiber optical system as recited in claim 2, wherein the first input plastic optical fiber has a first side face that intersects the second end face of the first input plastic optical fiber, and the second input plastic optical fiber has a second side face that intersects the second end face of the second input plastic optical fiber, further comprising a layer of index matching epoxy disposed between and bonding confronting portions of the first and second side faces with no metal layer therebetween.

4. The fiber optical system as recited in claim 1, wherein the second area is equal to the third area.

5. The fiber optical system as recited in claim 1, wherein the first and second end faces of the mixing optical fiber have a circular shape.

6. The fiber optical system as recited in claim 5, wherein the second end faces of the first and second input plastic optical fibers are disposed adjacent to each other and form respective sections of a circle that meet along a chord of the circle.

7. The fiber optical system as recited in claim 1, wherein the mixing optical fiber comprises a step-index plastic optical fiber.

8. The fiber optical system as recited in claim 1, further comprising an outer cladding in which respective first sections of the plurality of output plastic optical fibers are embedded, wherein each of the output plastic optical fibers comprise a respective second section extending beyond the outer cladding, wherein the second sections of the plurality of output plastic optical fibers are splayed.

9. The fiber optical system as recited in claim 8, further comprising:

a ferrule that surrounds the mixing optical fiber, portions of the first and second input plastic optical fibers adjacent to the mixing optical fiber, and at least a portion of the outer cladding; and potting optical epoxy disposed inside the ferrule for securing the mixing optical fiber, portions of the first and second input plastic optical fibers adjacent to the mixing optical fiber, and at least a portion of the outer cladding inside the ferrule.

10. The fiber optical system as recited in claim 1, further comprising:

a tapered mixing rod comprising an input face having a fifth area and an output face having a sixth area, the fifth area being greater than the sixth area; and a plurality of third input plastic optical fibers having end faces with the first area attached to the input face of the tapered mixing rod, wherein the first end face of the first input plastic optical fiber is attached to the output face of the tapered mixing rod.

* * * * *